US011702555B2

(12) United States Patent
Tanno

(10) Patent No.: US 11,702,555 B2
(45) Date of Patent: Jul. 18, 2023

(54) PNEUMATIC TIRE, MANUFACTURING DEVICE FOR PNEUMATIC TIRE, AND METHOD OF MANUFACTURING PNEUMATIC TIRE

(71) Applicant: The Yokohama Rubber Co., LTD., Tokyo (JP)

(72) Inventor: Atsushi Tanno, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 715 days.

(21) Appl. No.: 15/522,275

(22) PCT Filed: Nov. 12, 2015

(86) PCT No.: PCT/JP2015/081897
§ 371 (c)(1),
(2) Date: Apr. 26, 2017

(87) PCT Pub. No.: WO2016/076402
PCT Pub. Date: May 19, 2016

(65) Prior Publication Data
US 2017/0334243 A1    Nov. 23, 2017

(30) Foreign Application Priority Data

Nov. 12, 2014 (JP) .................................. 2014-229992
Apr. 23, 2015 (JP) .................................. 2015-088691

(51) Int. Cl.
*B60C 11/00* (2006.01)
*B60C 11/24* (2006.01)
(Continued)

(52) U.S. Cl.
CPC ............ *C09D 7/48* (2018.01); *B29D 30/0061* (2013.01); *B29D 30/0633* (2013.01); *B60C 1/00* (2013.01);
(Continued)

(58) Field of Classification Search
CPC ............................ B60C 11/1346; B60C 11/24
See application file for complete search history.

(56) References Cited

U.S. PATENT DOCUMENTS 2,706,509 A * 4/1955 White ..................... B60C 11/24
152/209.21
3,062,696 A * 11/1962 Richl ................. B29D 30/0061
156/128.6
(Continued)

FOREIGN PATENT DOCUMENTS

CN    1840328    10/2006
CN    1840328    4/2011
(Continued)

OTHER PUBLICATIONS

Machine translation for Japan 04-085104 (Year: 2019).*
(Continued)

*Primary Examiner* — Steven D Maki
(74) *Attorney, Agent, or Firm* — Thorpe North & Western

(57) ABSTRACT

A pneumatic tire that rotates about a center axis includes a tread rubber that comprises a contact patch; a groove provided in the tread rubber, the groove having an inner surface that includes a bottom surface and side surfaces that connect the bottom surface to the contact patch; and a coating film disposed covering at least a portion of the inner surface, the coating film reducing exposure of ultraviolet light to the inner surface.

15 Claims, 20 Drawing Sheets

(51) Int. Cl.

| | | |
|---|---|---|
| *C09D 7/48* | (2018.01) | |
| *C08K 5/00* | (2006.01) | |
| *B60C 11/13* | (2006.01) | |
| *C09D 175/06* | (2006.01) | |
| *C08G 18/44* | (2006.01) | |
| *B60C 1/00* | (2006.01) | |
| *C08K 3/04* | (2006.01) | |
| *C08K 3/22* | (2006.01) | |
| *C09D 7/61* | (2018.01) | |
| *B29D 30/00* | (2006.01) | |
| *B29D 30/06* | (2006.01) | |
| *C08K 5/3492* | (2006.01) | |
| *C08K 5/29* | (2006.01) | |
| *C08K 5/134* | (2006.01) | |
| *C08K 5/3475* | (2006.01) | |

(52) U.S. Cl.
CPC .......... *B60C 11/1346* (2013.01); *B60C 11/24* (2013.01); *C08G 18/44* (2013.01); *C08K 3/04* (2013.01); *C08K 3/22* (2013.01); *C08K 5/00* (2013.01); *C09D 7/61* (2018.01); *C09D 175/06* (2013.01); *C08K 5/1345* (2013.01); *C08K 5/29* (2013.01); *C08K 5/3475* (2013.01); *C08K 5/3492* (2013.01); *C08K 2003/2237* (2013.01); *C08K 2003/2241* (2013.01); *C08K 2003/2296* (2013.01)

(56) References Cited

U.S. PATENT DOCUMENTS

| | | | | |
|---|---|---|---|---|
| 4,131,149 A | * | 12/1978 | Roberts, Jr. | B29D 30/72 |
| | | | | 152/452 |
| 5,370,167 A | * | 12/1994 | Kogure | B60C 9/18 |
| | | | | 152/209.18 |
| 5,723,534 A | * | 3/1998 | Murray | C08G 18/10 |
| | | | | 524/590 |
| 6,062,283 A | * | 5/2000 | Watanabe | B60C 1/0008 |
| | | | | 152/DIG. 16 |
| 2004/0050471 A1 | | 3/2004 | Cottin et al. | |
| 2004/0055680 A1 | * | 3/2004 | Cottin | B60C 13/001 |
| | | | | 152/151 |
| 2004/0118496 A1 | * | 6/2004 | Vannan | B60C 11/00 |
| | | | | 152/209.5 |
| 2007/0062623 A1 | | 3/2007 | Chassagnon et al. | |
| 2008/0041508 A1 | | 2/2008 | Cambon et al. | |
| 2012/0165956 A1 | | 6/2012 | Li | |
| 2012/0186727 A1 | | 7/2012 | Inukai et al. | |
| 2012/0194076 A1 | | 8/2012 | Murata | |
| 2015/0246586 A1 | * | 9/2015 | Roty | B60C 11/1353 |
| | | | | 152/209.22 |

FOREIGN PATENT DOCUMENTS

| | | | |
|---|---|---|---|
| JP | S63-188504 | | 8/1988 |
| JP | 04-085104 A | * | 3/1992 |
| JP | H04-085104 | | 3/1992 |
| JP | 08-258517 A | * | 10/1996 |
| JP | 08-318715 A | * | 12/1996 |
| JP | H08-318715 | | 12/1996 |
| JP | 2000-038010 A | * | 2/2000 |
| JP | 2000-142026 A | * | 5/2000 |
| JP | 2002-301907 | | 10/2002 |
| JP | 2004-516988 | | 6/2004 |
| JP | 2004-526814 | | 9/2004 |
| JP | 2006-062404 A | | 3/2006 |
| JP | 2006-088585 A | * | 4/2006 |
| JP | 2007-509804 | | 4/2007 |
| JP | 2007-509805 | | 4/2007 |
| JP | 2007-223569 | | 9/2007 |
| JP | 2010-047073 A | * | 3/2010 |
| JP | 2012-077280 | | 4/2012 |
| JP | 2012-144096 | | 8/2012 |
| JP | 2012-176682 | | 9/2012 |
| JP | 2012-176682 A | * | 9/2012 |
| JP | 2012-218511 | | 11/2012 |
| JP | 2012-250574 | | 12/2012 |
| JP | 2012-250574 A | * | 12/2012 |
| JP | 2013-146905 | | 8/2013 |
| JP | 2013-159677 A | * | 8/2013 |
| JP | 2013-177113 | | 9/2013 |
| WO | WO 2002/053661 | | 7/2002 |
| WO | WO 2002/053662 | | 7/2002 |
| WO | WO 2005/044593 | | 5/2005 |
| WO | WO 2005/044594 | | 5/2005 |
| WO | WO 2011/016231 | | 2/2011 |
| WO | WO 2011/074617 | | 6/2011 |
| WO | WO 2012/087826 | | 6/2012 |
| WO | WO 2013/108537 | | 7/2013 |
| WO | WO 2014/038565 | | 3/2014 |
| WO | WO-2014/038565 A1 | * | 3/2014 |

OTHER PUBLICATIONS

Machine translation for Japan 2013-159677 (Year: 2019).*
Machine translation for Japan 2012-250574 (Year: 2019).*
Machine translation for Japan 2012-176682 (Year: 2019).*
Machine translation for Japan 2010-047073 (Year: 2019).*
Machine translation for Japan 2000-142026 (Year: 2019).*
Machine translation for Japan 08-318715 (Year: 2019).*
Partial translation for Japan 04-085104 (Year: 2019).*
Machine translation for WO 2014/038565 (Year: 2019).*
Machine translation for Japan 08-258517 (Year: 2020).*
Machine translation for Japan 2000-038010 (Year: 2020).*
Machine translation for Japan 2006-088585 (Year: 2022).*
International Search Report for International Application No. PCT/JP2015/081897 dated Jan. 26, 2016, 14 pages, Japan.

* cited by examiner

| | EXAMPLE 1 | EXAMPLE 2 | COMPARATIVE EXAMPLE |
|---|---|---|---|
| GROOVE CRACKING | NO | NO | YES |

PNEUMATIC TIRE, MANUFACTURING DEVICE FOR PNEUMATIC TIRE, AND METHOD OF MANUFACTURING PNEUMATIC TIRE

TECHNICAL FIELD

The present technology relates to a pneumatic tire, a manufacturing device for a pneumatic tire, and a method of manufacturing a pneumatic tire.

BACKGROUND ART

Pneumatic tires are prone to groove cracking on the inner surfaces of grooves in the tread portion. Japanese Unexamined Patent Application Publication No. 2013-177113A describes an example of technology with an object of suppressing groove cracking. Other known examples include a method of coating the surface of the rubber of a pneumatic tire to impart a specific function to the pneumatic tire (for example, see Japanese Unexamined Patent Application Publication No. 2004-526814A).

SUMMARY

The cause of groove cracking includes the composition of the compounding agents contained in the rubber of the tread portion, age deterioration of the rubber of the tread portion, deformation of the pneumatic tire during travel, exposure of the inner surfaces of the grooves to ozone, exposure of the inner surfaces of the grooves to ultraviolet light, and the like. In particular, exposure of the inner surfaces of the grooves in the tread portion to ozone in the air and to ultraviolet light are two causes that increase the chance of groove cracking.

By coating the inner surfaces of the grooves in a tread rubber of a pneumatic tire, the performance of the pneumatic tire may be improved. However, a tread rubber of a pneumatic tire is provided with main grooves, lug grooves, sipes, and other such grooves with varying extension directions and widths.

The present technology provides a pneumatic tire capable of preventing groove cracking caused by exposure to ozone and ultraviolet light. The present technology provides a manufacturing device for a pneumatic tire and a method of manufacturing a pneumatic tire capable of smoothly coating an inner surface of a groove in a tread rubber.

A first aspect of the present technology is a pneumatic tire that rotates about a center axis, the pneumatic tire comprising: a tread rubber that comprises a contact patch; a groove provided in the tread rubber, the groove comprising an inner surface that comprises a bottom surface and side surfaces that connect the bottom surface to the contact patch; and a coating film disposed covering at least a portion of the inner surface, the coating film reducing exposure of ultraviolet light to the inner surface.

According to the first aspect of the present technology, the coating film reduces the amount of ozone and ultraviolet light the inner surface of the groove in the tread rubber is exposed to. Thus, groove cracking caused by exposure to ozone and ultraviolet light is suppressed. "Groove cracks" refer to cracks in the inner surfaces of the grooves in the tread rubber. By the coating film being provided, the tread rubber is prevented from coming in direct contact with air at the inner surfaces of the grooves. By providing the coating film which functions as an air blocking film, chemical attacks from ozone in the air on the rubber composition are greatly suppressed. Additionally, by providing the coating film with a compound that reduces ultraviolet light, the inner surfaces of the grooves in the tread rubber are prevented from coming into direct contact with ultraviolet light. Thus, groove cracking caused by exposure to ozone and exposure to ultraviolet light is suppressed.

The groove in the tread rubber comprises at least one of: a main groove (circumferential groove), a lug groove, an inclined groove, or a sipe. "Main groove" refers to a circumferential groove having a groove width of 4.0 mm or greater. The main groove may have a width of 4.0 mm or greater and a depth of 5.0 mm or greater. "Lug groove" refers to a lateral groove having a groove width of 1.5 mm or greater. The lug groove may have a width of 1.5 mm or greater, a depth of 4.0 mm or greater, and in a portion thereof have a depth of less than 4.0 mm. "Sipe" refers to a lateral groove having a width of less than 1.5 mm. A sipe is a groove with an opening that closes upon contact with the ground.

The first aspect of the present technology may further comprise a primer film with a water-based acrylic emulsion as a main component disposed between the inner surface and the coating film.

According to this configuration, the adhesive strength between the coating film and the inner surface of the tread rubber is improved. By improving the adhesive strength between the coating film and the inner surface of the tread rubber, the coating film is provided with sufficient air barrier functionality. Thus, groove cracking caused by exposure to ozone is suppressed. Additionally, by improving the adhesive strength, the coating film is provided with sufficient ultraviolet light shielding functionality. Thus, groove cracking caused by exposure to ultraviolet light is suppressed.

The first aspect of the present technology may also have a configuration wherein the following conditions are satisfied:

$$H \geq 0.3D, \text{ and}$$

$$H/W \leq 5, \text{ where}$$

H is a depth of the groove, W is a width of the groove, and D is a thickness of the tread rubber.

According to this configuration, groove cracking caused by exposure to ultraviolet light is effectively suppressed.

The first aspect of the present technology may also have a configuration wherein the inner surface has a center line average surface roughness (Ra75) of from 1 μm to 100 μm.

According to this configuration, the adhesiveness between the coating film and the inner surface of the tread rubber is improved. Thus, the coating film is provided with sufficient air barrier functionality, and groove cracking caused by exposure to ozone is suppressed. The coating film is provided with sufficient ultraviolet light shielding functionality, and groove cracking caused by exposure to ultraviolet light is suppressed.

The first aspect of the present technology may also have a configuration wherein the coating film is disposed covering the inner surface on the bottom surface side of positions located at 0.5H from the contact patch in a depth direction of the groove, where H is a depth of the groove when the pneumatic tire is new.

According to this configuration, the coating film is prevented from coming into contact with the ground when the pneumatic tire is new and during the early and intermediate stages of wear while retaining ultraviolet light shielding functionality and air barrier functionality. As a result, degradation of the coating film, and separation of the coating film from the tread rubber are suppressed.

The first aspect of the present technology may further comprise a slip sign provided in the groove; wherein the coating film is disposed covering the inner surface on the bottom surface side of an upper line of the slip sign in a depth direction of the groove.

According to this configuration, the coating film is prevented from coming into contact with the ground when the pneumatic tire is new and during the early and intermediate stages of wear while retaining ultraviolet light shielding functionality and air barrier functionality. As a result, degradation of the coating film, and separation of the coating film from the tread rubber are suppressed.

The first aspect of the present technology may also have a configuration wherein the coating film comprises a first coating film and a second coating film disposed adjacent to the first coating film with a gap therebetween.

According to this configuration, even if the first coating film or the second coating film separates from the tread rubber, the other is prevented from separating from the tread rubber. In other words, by providing the gap portion of the coating film between the first coating film and the second coating film, expansion of separation is suppressed.

The first aspect of the present technology may also have a configuration wherein the groove comprises a main groove disposed in a tire circumferential direction; the first coating film and the second coating film are disposed in the main groove in the tire circumferential direction; and dimensions in the tire circumferential direction of a gap portion of the coating film located between the first coating film and the second coating film are less than dimensions of the first coating film and the second coating film.

As a result, ultraviolet light shielding functionality and air barrier functionality are retained and expansion of separation is suppressed.

The first aspect of the present technology may also have a configuration wherein the groove comprises a lug groove connected to the main groove; and the gap portion is disposed at an intersection portion where the main groove and the lug groove meet.

According to this configuration, separation of the first coating film and the second coating film is suppressed. When the pneumatic tire runs, the intersection portion where the main groove and the lug groove meet are prone to deformation. By not providing the deformation-prone intersection portion with the coating film, separation of the coating film is suppressed.

The first aspect of the present technology may also have a configuration wherein the groove comprises a main groove disposed in a tire circumferential direction; the first coating film and the second coating film are disposed in the main groove in a tire width direction; and dimensions in the tire width direction of a gap portion of the coating film located between the first coating film and the second coating film are less than dimensions of the first coating film and the second coating film.

As a result, ultraviolet light shielding functionality and air barrier functionality are retained and expansion of separation is suppressed.

The first aspect of the present technology may also have a configuration wherein the coating film has a thickness of from 5 μm to 120 μm.

According to this configuration, the coating film can sufficiently deform in accordance with the tread rubber when it deforms while retaining ultraviolet light shielding functionality and air barrier functionality. Thus, separation of the coating film is suppressed.

The first aspect of the present technology may also have a configuration wherein the coating film has a transmittance with respect to the ultraviolet light having wavelengths from 290 nm to 380 nm of 0.5 or less.

According to this configuration, the amount of ultraviolet light that the inner surface of the tread rubber is exposed to is sufficiently suppressed.

The first aspect of the present technology may also have a configuration wherein the coating film comprises a resin composition with urethane as a main component and a carbon black or a pigment.

According to this configuration, the coating film sufficiently absorbs the ultraviolet light that the coating film is exposed to. Thus, the amount of ultraviolet light that the inner surface of the tread rubber is exposed to is sufficiently suppressed.

The first aspect of the present technology may also have a configuration wherein the coating film comprises a resin composition with urethane as a main component and at least one of: a benzotriazole-based ultraviolet light absorbing agent, a benzophenone-based ultraviolet light absorbing agent, a salicylate-based ultraviolet light absorbing agent, a cyanoacrylate-based ultraviolet light absorbing agent, a nickel-based ultraviolet light absorbing agent, a triazine-based ultraviolet light absorbing agent, or a hindered amine-based light stabilizer.

According to this configuration, the coating film sufficiently absorbs the ultraviolet light that the coating film is exposed to. Thus, the amount of ultraviolet light that the inner surface of the tread rubber is exposed to is sufficiently suppressed.

The first aspect of the present technology may also have a configuration wherein the coating film comprises a resin composition with urethane as a main component and titanium oxide or zinc oxide.

According to this configuration, the coating film sufficiently reflects the ultraviolet light that the coating film is exposed to. Thus, the amount of ultraviolet light that the inner surface of the tread rubber is exposed to is sufficiently suppressed.

The first aspect of the present technology may also have a configuration wherein the resin composition has polycarbonate-based urethane as a main component.

According to this configuration, the coating film can sufficiently deform in accordance with the tread rubber when it deforms. Thus, separation of the coating film is suppressed.

A second aspect of the present technology is a manufacturing device for a pneumatic tire, the manufacturing device comprising: a vulcanization mold comprising a projection portion for forming a groove in a tread rubber of a pneumatic tire; and a supply device that supplies a coating material to the projection portion for reducing exposure of ultraviolet light to an inner surface of the groove; the manufacturing device vulcanizing a green tire with the projection portion on which the coating material is supplied being in contact with the green tire, and forming a coating film on the inner surface of the groove that reduces exposure of ultraviolet light thereto.

According to the second aspect of the present technology, by supplying the coating material to the projection portion of the vulcanization mold and bringing the projection portion in contact with the green tire, the inner surface of the groove in the tread rubber is coated with the coating material. The projection portion comprises at least one of: a main groove projection portion for forming the main groove, a lug groove projection portion for forming the lug groove, or a sipe projection portion for forming the sipe. Accordingly, the inner surfaces of grooves with varying extension directions and widths may be smoothly coated. Additionally, according to the second aspect of the present technology, the coating material is transferred to the green tire upon vulcanization of the green tire. As a result, the coating film of the coating material and the tread rubber adhere with high adhesive strength. Additionally, the formed coating film reduces the amount of ultraviolet light the inner surface of the groove in the tread rubber is exposed to. Thus, groove cracking caused by exposure to ultraviolet light is suppressed.

The second aspect of the present technology may also have a configuration wherein the supply device comprises an application member that comprises a surface to which the coating material is applied; and the application member is brought into contact with the projection portion to supply the coating material to the projection portion.

By using the application member, which is not a member of the vulcanization mold, the coating material is applied to only the projection portion of the vulcanization mold, and undesirable application of the coating material to other portions of the vulcanization mold is suppressed. Additionally, as the vulcanization mold and the application member are separate members, the application member can be removed from the vulcanization mold after applying the coating material to the projection portion prior to vulcanization. By performing vulcanization after removing the application member from the vulcanization mold, only the coating material applied to the projection portion is transferred to the green tire, and the transfer of unnecessary coating material to the green tire is suppressed.

The second aspect of the present technology may also have a configuration wherein the surface of the application member comprises a curved surface projecting toward the projection portion.

By the surface of the application member comprising a curved surface projecting toward the projection portion, the coating material is applied to only the projection portion of the vulcanization mold, and undesirable application of the coating material to other portions of the vulcanization mold is suppressed.

The second aspect of the present technology may also have a configuration wherein the vulcanization mold comprises an inner surface for forming the contact patch of the tread rubber, the projection portion projects from the inner surface, and the curvature of the surface of the application member is greater than the curvature of the inner surface of the vulcanization mold.

By the surface of the application member having a greater curvature than the inner surface of the vulcanization mold, undesirable application of the coating material to other portions of the vulcanization mold is further suppressed.

The second aspect of the present technology may also have a configuration wherein the surface of the projection portion on which the coating material is supplied comprises a rough surface region rendered with a rough surface.

By roughening the surface of the projection portion, the coating material holding power of the projection portion is improved, and the projection portion can hold a sufficient amount of the coating material. Additionally, by improving the holding power, the coating material is prevented from dripping from the projection portion after being supplied with the coating material.

The second aspect of the present technology may also have a configuration wherein the rough surface region comprises a first rough surface region and a second rough surface region disposed adjacent to the first rough surface region with the non-rough surface region disposed therebetween.

The rough surface regions function as affinity regions with high affinity to the coating material. The non-rough surface region functions as a non-affinity region with low affinity to the coating material. By rendering the rough surface regions to sufficiently hold the coating material and the non-rough surface region to not hold the coating material, the coating material can be transferred from the rough surface regions to the green tire and not transferred from the non-rough surface region to the green tire. As a result, a pattern of the coating film that corresponds to the pattern of the rough surface regions and the non-rough surface region is formed on the inner surface of the groove. Additionally, by disposing the non-rough surface region between the first rough surface region and the second rough surface region, the first coating film and the second coating film are provided on the inner surface of the groove, the first coating film being the film of coating material transferred from the first rough surface region, and the second coating film being the film of coating material transferred from the second rough surface region. The coating material is not transferred from the non-rough surface region to the green tire, thus, the gap portion with no coating film is provided between the first coating film and the second coating film. By providing the gap portion between the first coating film and the second coating film, expansion of separation of the coating film is suppressed. In other words, even if the first coating film or the second coating film separates from the tread rubber, the other is prevented from separating from the tread rubber by the gap portion.

The second aspect of the present technology may also have a configuration wherein the groove comprises a main groove disposed in the tire circumferential direction, the projection portion comprises a main groove projection portion for forming the main groove, the first rough surface region and the second rough surface region are disposed on the surface of the main groove projection portion in the tire circumferential direction, and the dimensions in the tire circumferential direction of the non-rough surface region between the first rough surface region and the second rough surface region are less than the dimensions of the first rough surface region and the second rough surface region.

By the dimensions in the tire circumferential direction of the non-rough surface region being small, the dimensions of the gap portion in the tire circumferential direction are made small, and the dimensions of the first coating film and the second coating film are made large. Thus, expansion of separation of the coating film is suppressed and the functionality of the coating film is sufficiently exhibited.

The second aspect of the present technology may also have a configuration wherein the groove comprises a lug groove connected to the main groove, the projection portion comprises a lug groove projection portion for forming the lug groove, and the non-rough surface region is disposed at an intersection portion where the main groove projection portion and the lug groove projection portion meet.

When the pneumatic tire runs, the intersection portion where the main groove and the lug groove meet are prone to deformation. By providing the non-rough surface region at the intersection portion where the main groove projection portion and the lug groove projection portion meet, the gap portion without the coating film is provided at the deformation-prone intersection portion where the main groove and the lug groove meet. According to this configuration, separation of the first coating film and the second coating film is suppressed.

The second aspect of the present technology may also have a configuration wherein the groove comprises a main groove disposed in the tire circumferential direction, the projection portion comprises a main groove projection portion for forming the main groove, the first rough surface region and the second rough surface region are disposed on the surface of the main groove projection portion in the tire width direction, and the dimensions in the tire width direction of the non-rough surface region between the first rough surface region and the second rough surface region are less than the dimensions of the first rough surface region and the second rough surface region.

By the dimensions in the tire width direction of the non-rough surface region being small, the dimensions of the gap portion in the tire width direction are made small, and the dimensions of the first coating film and the second coating film are made large. Thus, expansion of separation of the coating film is suppressed and the functionality of the coating film is sufficiently exhibited.

The second aspect of the present technology may also have a configuration wherein the rough surface regions have an arithmetic mean roughness of from 0.5 μm to 150 μm.

If the arithmetic mean roughness of the rough surface regions is less than 0.5 μm, the holding power of the coating material provided by the projection portion may not be sufficient. If the arithmetic mean roughness of the rough surface regions is greater than 150 μm, the holding power of the coating material provided by the projection portion becomes excessive, and the coating material is unlikely to be transferred from the projection portion to the green tire. By the arithmetic mean roughness of the rough surface regions being from 0.5 μm to 150 μm, the projection portion can hold the coating material, and the coating material can be transferred to the green tire.

A third aspect of the present technology is a method of manufacturing a pneumatic tire, the method comprising the steps of: supplying a coating material to a projection portion provided on a vulcanization mold for vulcanizing a green tire and manufacturing a pneumatic tire, the projection portion being for forming a groove in a tread rubber of the pneumatic tire, and the coating material being for reducing exposure of ultraviolet light to an inner surface of the groove; vulcanizing the green tire with the projection portion on which the coating material is supplied being in contact with the green tire; and covering the inner surface of the groove of the pneumatic tire with a coating film by the coating material being transferred to the green tire upon vulcanization, the coating film being for reducing exposure of ultraviolet light to the inner surface of the groove.

According to the third aspect of the present technology, the inner surface of the groove in the tread rubber is smoothly coated with the coating material. Additionally, the coating film of the coating material and the tread rubber adhere with high adhesive strength. Additionally, the formed coating film reduces the amount of ultraviolet light the inner surface of the groove in the tread rubber is exposed to. Thus, groove cracking caused by exposure to ultraviolet light is suppressed.

The third aspect of the present technology may also have a configuration wherein an application member comprising a surface to which the coating material is applied is brought into contact with the projection portion to supply the coating material to the projection portion.

Accordingly, the coating material is applied to only the projection portion of the vulcanization mold, and undesirable application of the coating material to other portions of the vulcanization mold is suppressed. Additionally, only the coating material applied to the projection portion is transferred to the green tire, and the transfer of unnecessary coating material is suppressed.

The third aspect of the present technology may also have a configuration wherein the surface of the application member comprises a curved surface projecting toward the projection portion.

Accordingly, the coating material is applied to only the projection portion of the vulcanization mold, and undesirable application of the coating material to other portions of the vulcanization mold is suppressed.

The third aspect of the present technology may also have a configuration wherein the vulcanization mold comprises an inner surface for forming the contact patch of the tread rubber, the projection portion projects from the inner surface, and the curvature of the surface of the application member is greater than the curvature of the inner surface of the vulcanization mold.

According to this configuration, undesirable application of the coating material to other portions of the vulcanization mold is further suppressed.

The third aspect of the present technology may also have a configuration wherein the surface of the projection portion on which the coating material is supplied comprises a rough surface region rendered with a rough surface.

According to this configuration, the holding power of the projection portion with respect to the coating material is improved.

The third aspect of the present technology may also have a configuration wherein the rough surface region comprises a first rough surface region and a second rough surface region disposed adjacent to the first rough surface region with the non-rough surface region disposed therebetween.

According to this configuration, expansion of separation of the first coating film and the second coating film formed by the coating material transferred to the green tire is suppressed.

The third aspect of the present technology may also have a configuration wherein the groove comprises a main groove disposed in the tire circumferential direction, the projection portion comprises a main groove projection portion for forming the main groove, the first rough surface region and the second rough surface region are disposed on the surface of the main groove projection portion in the tire circumferential direction, and the dimensions in the tire circumferential direction of the non-rough surface region between the first rough surface region and the second rough surface region are less than the dimensions of the first rough surface region and the second rough surface region.

According to this configuration, expansion of separation of the coating film is suppressed and the functionality of the coating film is sufficiently exhibited.

The third aspect of the present technology may also have a configuration wherein the groove comprises a lug groove connected to the main groove, the projection portion comprises a lug groove projection portion for forming the lug groove, and the non-rough surface region is disposed at an intersection portion where the main groove projection portion and the lug groove projection portion meet.

According to this configuration, separation of the first coating film and the second coating film is suppressed.

The third aspect of the present technology may also have a configuration wherein the groove comprises a main groove disposed in the tire circumferential direction, the projection portion comprises a main groove projection portion for forming the main groove, the first rough surface region and the second rough surface region are disposed on the surface of the main groove projection portion in the tire width direction, and the dimensions in the tire width direction of the non-rough surface region between the first rough surface region and the second rough surface region are less than the dimensions of the first rough surface region and the second rough surface region.

According to this configuration, expansion of separation of the coating film is suppressed and the functionality of the coating film is sufficiently exhibited.

The third aspect of the present technology may also have a configuration wherein the rough surface regions have an arithmetic mean roughness of from 0.5 μm to 150 μm.

According to this configuration, the projection portion can hold the coating material, and the coating material can be transferred to the green tire.

The third aspect of the present technology may also have a configuration wherein the coating material has a viscosity of from 0.5 Pa·s to 10.0 Pa·s.

According to this configuration, the coating material is held by the projection portion with high holding power.

The third aspect of the present technology may also have a configuration wherein the coating film has a transmittance with respect to the ultraviolet light having wavelengths from 290 nm to 380 nm of 0.5 or less.

According to this configuration, the amount of ultraviolet light that the inner surface of the groove in the tread rubber is exposed to is sufficiently suppressed.

The third aspect of the present technology may also have a configuration wherein the coating film has a thickness of from 5 μm to 120 μm.

According to this configuration, the coating film can sufficiently deform in accordance with the tread rubber when it deforms while retaining ultraviolet light shielding functionality and air barrier functionality. By the coating film sufficiently deforming in accordance with the tread rubber when it deforms, separation of the coating film is suppressed.

The third aspect of the present technology may also have a configuration wherein the coating film comprises a resin composition with urethane as a main component and a carbon black or a pigment.

According to this configuration, the coating film sufficiently absorbs the ultraviolet light that the coating film is exposed to. Thus, the amount of ultraviolet light that the inner surface of the groove in the tread rubber is exposed to is sufficiently suppressed.

The third aspect of the present technology may also have a configuration wherein the coating film comprises a resin composition with urethane as a main component and at least one of: a benzotriazole-based ultraviolet light absorbing agent, a benzophenone-based ultraviolet light absorbing agent, a salicylate-based ultraviolet light absorbing agent, a cyanoacrylate-based ultraviolet light absorbing agent, a nickel-based ultraviolet light absorbing agent, a triazine-based ultraviolet light absorbing agent, or a hindered amine-based light stabilizer.

According to this configuration, the coating film sufficiently absorbs the ultraviolet light that the coating film is exposed to. Thus, the amount of ultraviolet light that the inner surface of the groove in the tread rubber is exposed to is sufficiently suppressed.

The third aspect of the present technology may also have a configuration wherein the coating film comprises a resin composition with urethane as a main component and titanium oxide or zinc oxide.

According to this configuration, the coating film sufficiently reflects the ultraviolet light that the coating film is exposed to. Thus, the amount of ultraviolet light that the inner surface of the tread rubber is exposed to is sufficiently suppressed.

The third aspect of the present technology may also have a configuration wherein the resin composition has polycarbonate-based urethane as a main component.

According to this configuration, the coating film can sufficiently deform in accordance with the tread rubber when it deforms. Thus, separation of the coating film is suppressed.

The third aspect of the present technology may also have a configuration wherein the following conditions are satisfied:

$H \geq 0.3D$, and $H/W \leq 5$, where

H is a depth of the groove, W is a width of the groove, and D is a thickness of the tread rubber.

According to this configuration, groove cracking caused by exposure to ultraviolet light is effectively suppressed.

The third aspect of the present technology may also have a configuration wherein the inner surface of the groove comprises a bottom surface and side surfaces that connect the bottom surface to the contact patch, and the coating film is disposed covering the inner surface on the bottom surface side of positions located at 0.5H from the contact patch in a depth direction of the groove, where H is a depth of the groove when the pneumatic tire is new.

According to this configuration, the coating film is prevented from coming into contact with the ground when the pneumatic tire is new and during the early and intermediate stages of wear while retaining ultraviolet light shielding functionality and air barrier functionality. As a result, degradation of the coating film, and separation of the coating film from the tread rubber are suppressed.

The third aspect of the present technology may further comprise a slip sign provided in the groove; and wherein the coating film is disposed covering the inner surface on the bottom surface side of an upper line of the slip sign in a depth direction of the groove.

According to this configuration, the coating film is prevented from coming into contact with the ground when the pneumatic tire is new and during the early and intermediate stages of wear while retaining ultraviolet light shielding functionality and air barrier functionality. As a result, degradation of the coating film, and separation of the coating film from the tread rubber are suppressed.

An aspect of the present technology provides a pneumatic tire capable of preventing groove cracking caused by exposure to ozone and ultraviolet light. Other aspects of the present technology provide a manufacturing device for a pneumatic tire and a method of manufacturing a pneumatic tire capable of smoothly coating an inner surface of a groove.

DETAILED DESCRIPTION

Embodiments according to the present technology will be described with reference to the drawings. However, the present technology is not limited to those embodiments. The constituents of the embodiments described below can be combined with one another as appropriate. In addition, some of the constituents may not be used in some embodiments.

In the description below, tire circumferential direction, tire radial direction, and tire width direction are terms used to explain the positional relationship of the components. The tire is rotatable about a center axis (rotation axis). "Tire circumferential direction" refers to a rotation direction about the center axis of the tire. "Tire radial direction" refers to a radiation direction out from the center axis of the tire. "Tire width direction" refers to a direction parallel to the center axis of the tire. "Inward in the tire radial direction" refers to the direction toward the center axis. "Outward in the tire radial direction" refers to the direction away from the center axis.

First Embodiment

Figure 1:
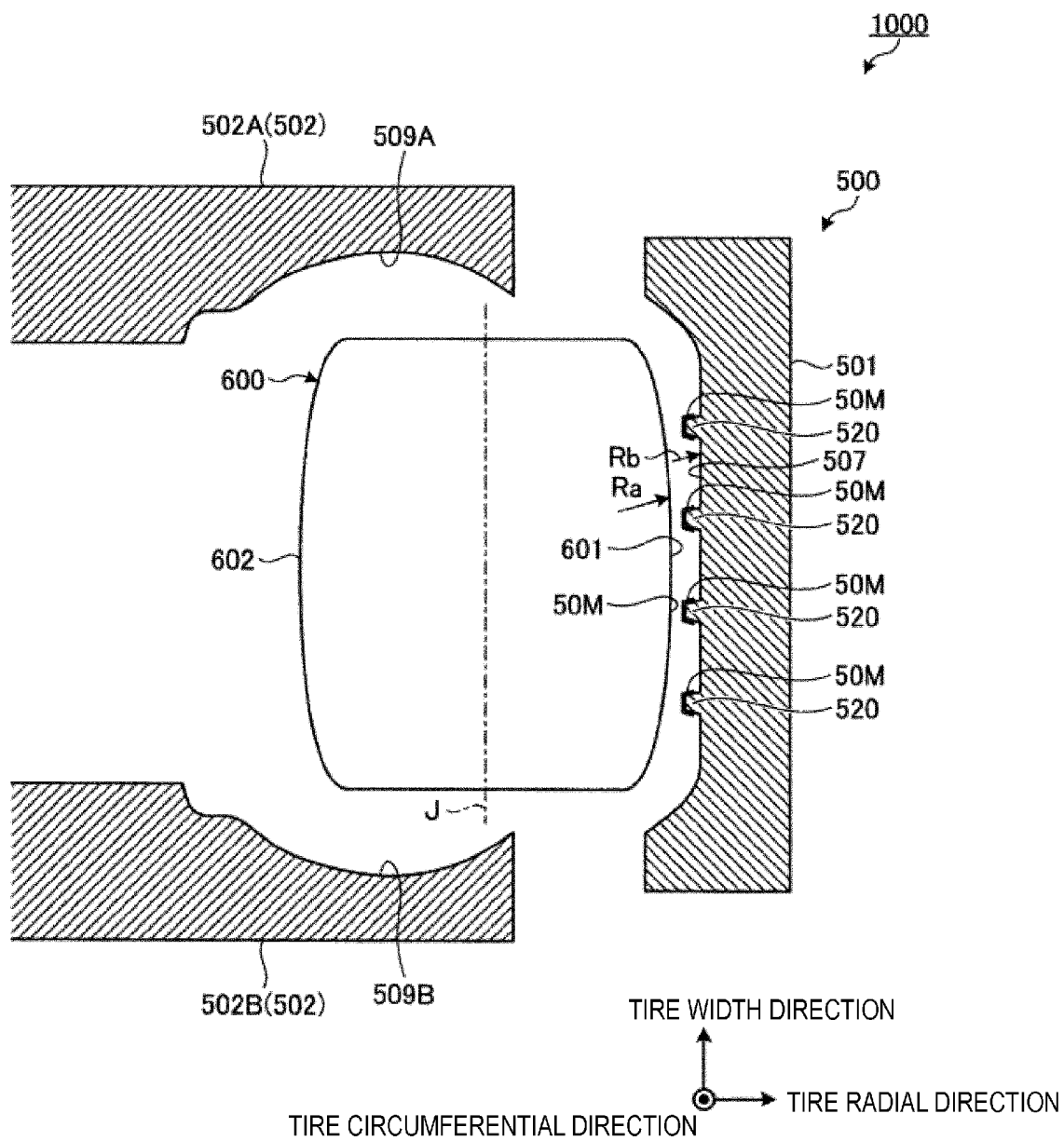
FIG. 1 is a cross-sectional view schematically illustrating a portion of a manufacturing device for a pneumatic tire according to a first embodiment.
Figure 2:
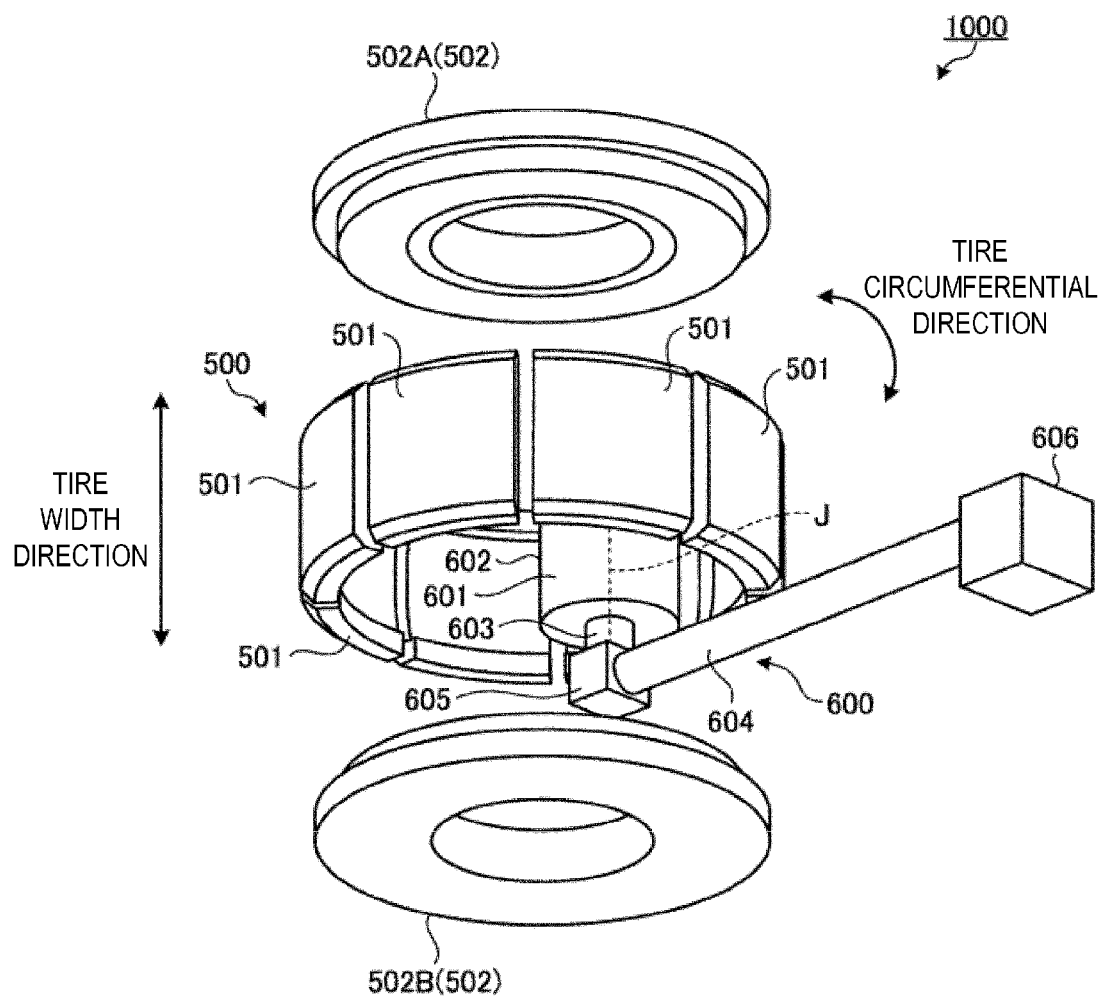
FIG. 2 is a perspective view schematically illustrating a portion of the manufacturing device for a pneumatic tire according to the first embodiment.

A first embodiment will be described. FIG. 1 is a cross-sectional view schematically illustrating a portion of a manufacturing device 1000 of the pneumatic tire. FIG. 2 is a perspective view schematically illustrating a portion of the manufacturing device 1000. In the description below, the pneumatic tire is also referred to as "tire" when appropriate.

The manufacturing device 1000 includes a vulcanizer provided with a vulcanization mold 500. A green tire (unvulcanized tire) is disposed inside the vulcanization mold 500. The green tire is supported by the vulcanization mold 500 when vulcanized. By vulcanizing the green tire using the vulcanization mold 500, a tire is manufactured.

The manufacturing device 1000 includes a supply device 600 that supplies a coating material 50M to the vulcanization mold 500. To manufacture the tire, the manufacturing device 1000 brings the vulcanization mold 500 on which the coating material 50M is supplied in contact with the green tire and vulcanizes the green tire.

The vulcanization mold 500 includes sector molds 501 for forming the tread portion of the tire, and side molds 502 for forming the sidewall portion of the tire.

The sector molds 501 are arranged in the tire circumferential direction. The sector molds 501 are members of an annular mold divided in the tire circumferential direction. The annular mold is divided into 8 or 9 sections, for example. These 8 or 9 sector molds 501 form the tread portion of the tire.

The sector molds 501 are moveable in the tire radial direction. The sector molds 501 are brought into contact with the outer peripheral surface of the green tire by being moved inward in the tire radial direction. The sector molds 501 are released from the green tire by being moved outward in the tire radial direction. The sector molds 501 move inward in the tire radial direction to form an integrated annular mold. The sector molds 501 move outward in the tire radial direction to become divided.

The sector molds 501 each include an inner surface 507 that corresponds to the outer peripheral surface of the green tire and projection portions 520 that project inward in the tire radial direction from the inner surface 507. The inner surface 507 forms the contact patch of the tread portion of the tire. The projection portions 520 form grooves in the tread rubber of the tire. A tread pattern is formed in the tire by the projection portions 520 provided on the inner surfaces 507 of the sector molds 501.

The side molds 502 include an upper side mold 502A and a lower side mold 502B. The upper side mold 502A includes an inner surface 509A that corresponds to one side surface of the green tire. The lower side mold 502B includes an inner surface 509B that corresponds to the other side surface of the green tire. The inner surface 509A and the inner surface 509B form the surfaces of the sidewall portions of the tire. The green tire is disposed between the upper side mold 502A and the lower side mold 502B.

The upper side mold 502A is released from the green tire by being moved upward. The upper side mold 502A is brought into contact with the side surface of the green tire by being moved downward. The lower side mold 502B is released from the green tire by being moved downward. The lower side mold 502B is brought into contact with the side surface of the green tire by being moved upward.

The supply device 600 supplies the coating material 50M to the projection portions 520 of the sector molds 501. The supply device 600 includes an application member 602 that has a surface 601 to which the coating material 50M is applied.

As illustrated in FIG. 2, the supply device 600 includes the application member 602, a support member 603 that supports the application member 602 for rotation about a rotation axis J, an arm member 604 that supports the support member 603, an actuator 605 that generates power for rotating the application member 602 about the rotation axis J, and an actuator 606 that generates power for moving the arm member 604. The application member 602 is an annular roller that rotates about the rotation axis J.

The coating material 50M is in a liquid form. The viscosity of the coating material 50M is from 0.5 Pa·s to 10.0 Pa·s. The method of measuring viscosity is as per that specified in Japanese Industrial Standards (JIS) Z 8803 2011. The application member 602 is a soft porous member able to contain the coating material 50M.

The supply device 600 brings the application member 602 into contact with the projection portions 520 to supply the coating material 50M to the projection portions 520. The coating material 50M is applied to the surfaces of the projection portions 520 via the application member 602.

As illustrated in FIGS. 1 and 2, the coating material 50M is supplied to the projection portions 520 while the annular mold is divided into the plurality of sector molds 501. Additionally, the coating material 50M is supplied to the projection portions 520 while the side molds 502 are separate from the sector molds 501. The actuator 606 moves the arm member 604 to dispose the application member 602 on the inner side of the annular mold. The actuator 605 rotates the application member 602. The actuator 606 moves the arm member 604 to bring the rotating application member 602 into contact with the surfaces of the projection portions 520 of the sector molds 501. In this manner, the surfaces of the projection portions 520 are coated with the coating material 50M.

The surfaces of the projection portions 520 of the sector molds 501 are coated with the coating material 50M. The inner surfaces 507 of the sector molds 501 are not coated with the coating material 50M. As illustrated in FIG. 1, the surface 601 of the application member 602 includes a curved surface projecting toward the projection portions 520. The surface 601 of the application member 602 has a curvature Ra greater than a curvature Rb of the inner surfaces 507 of the sector molds 501 of the vulcanization mold 500.

Figure 3:
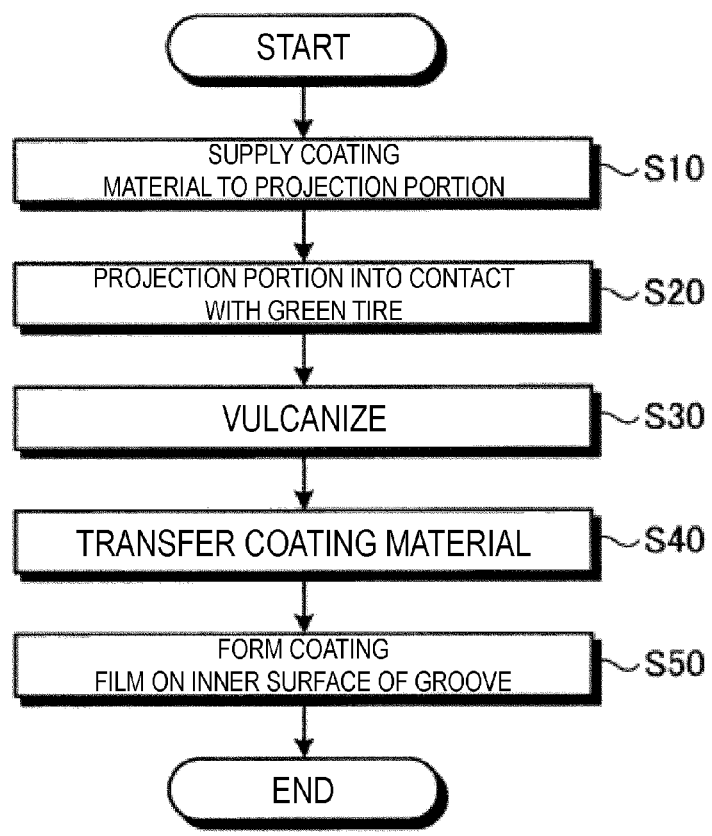
FIG. 3 is a flow chart illustrating a method of manufacturing a pneumatic tire according to the first embodiment.
Figure 4:
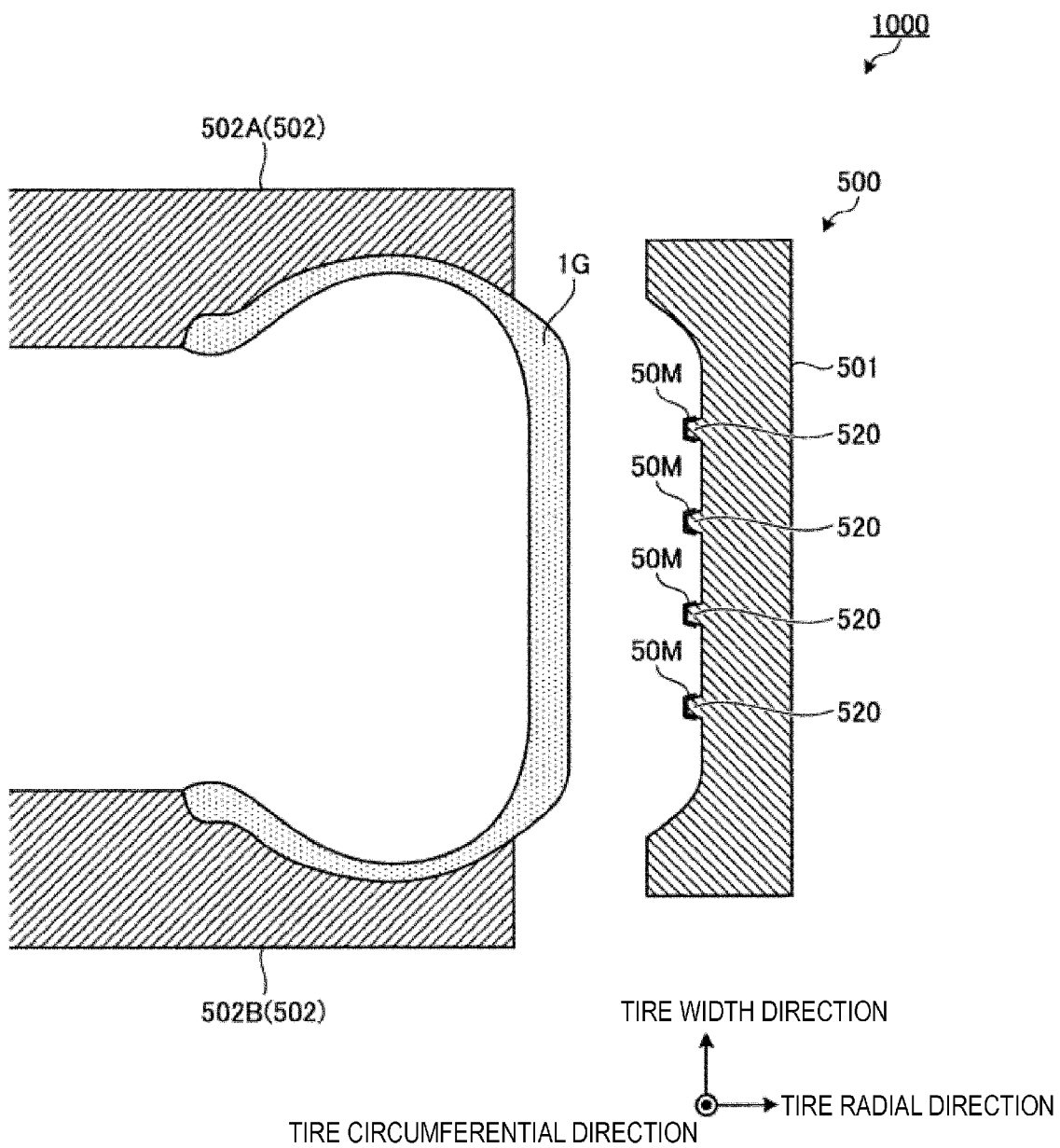
FIG. 4 is a drawing schematically illustrating the operation of the manufacturing device for a pneumatic tire according to the first embodiment.
Figure 5:
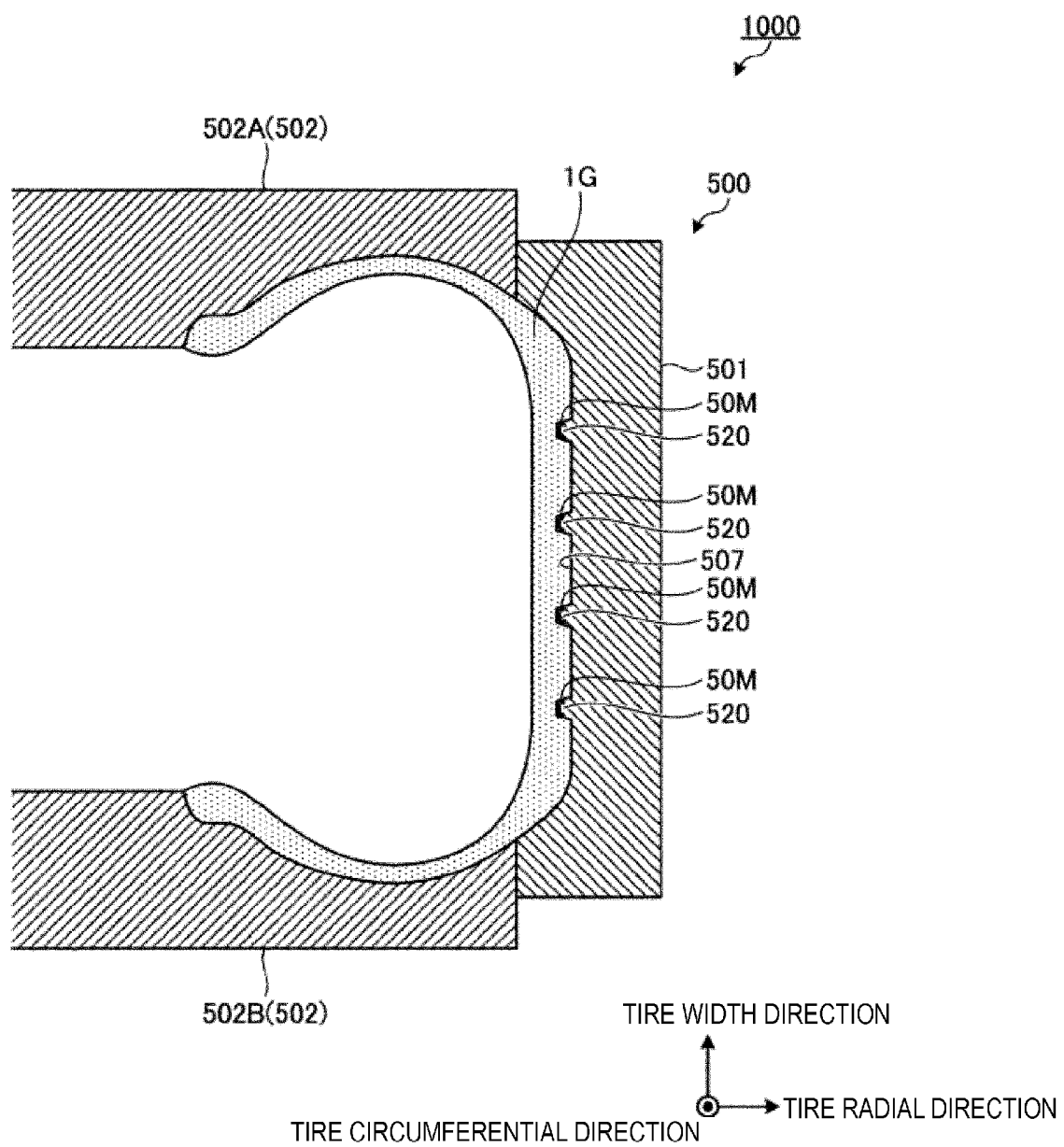
FIG. 5 is a drawing schematically illustrating the operation of the manufacturing device for a pneumatic tire according to the first embodiment.

Next, a method of manufacturing a tire will be explained. FIG. 3 is a flowchart illustrating a method of manufacturing a tire. FIGS. 4 and 5 are cross-sectional views schematically illustrating the operation of the manufacturing device 1000.

As explained while referencing FIGS. 1 and 2, the supply device 600 supplies the coating material 50M to the projection portions 520 for forming grooves in the tread rubber of the tire while the sector molds 501 are divided and the side molds 502 are separate from the sector molds 501 (step S10). The supply device 600 brings the application member 602 with the coating material 50M applied to the surface 601 into contact with the projection portions 520 to coat the projection portions 520 with the coating material 50M. In this manner, the coating material 50M is held by the surfaces of the projection portions 520. The inner surfaces 507 are not supplied with the coating material 50M.

As illustrated in FIG. 4, a green tire 1G is disposed between the upper side mold 502A and the lower side mold 502B. The green tire 1G is supported by the upper side mold 502A and the lower side mold 502B.

As illustrated in FIG. 5, the sector molds 501 are moved inward in the tire radial direction. Accordingly, the sector molds 501 couple to one another to form the annular mold. By moving the sector molds 501 inward in the tire radial direction, the green tire 1G comes into contact with the inner surfaces 507 of the sector molds 501 to which the coating material 50M has not been supplied. Additionally, by moving the sector molds 501 inward in the tire radial direction, the green tire 1G comes into contact with the projection portions 520 of the sector molds 501 to which the coating material 50M has been supplied (step S20).

The manufacturing device 1000 vulcanizes the green tire 1G with the green tire 1G in contact with the inner surfaces 507 to which the coating material 50M has not been supplied and the projection portions 520 to which the coating material 50M is supplied (step 30). The manufacturing device 1000 pressurizes and heats the green tire 1G using the vulcanization mold 500 with the green tire 1G supported in the vulcanization mold 500.

The temperature of the vulcanization mold 500 during vulcanization is set to from 130° C. to 180° C. If the temperature of the vulcanization mold 500 is lower than 130° C., in the green tire 1Q bonding of the rubber molecules and the sulfur molecules may not proceed sufficiently. If the temperature of the vulcanization mold 500 is higher than 180° C., the coating material 50M may thermally decompose, changing the physical properties of the coating material 50M. By setting the temperature of the vulcanization mold 500 during vulcanization to from 130° C. to 180° C., vulcanization is promoted while suppressing any change in the physical properties of the coating material 50M. Note that the temperature of the vulcanization mold 500 during vulcanization is preferably from 130° C. to 170° C. from the perspective of suppressing change in the physical properties of the coating material 50M.

By vulcanizing the green tire 1G with the green tire 1G in contact with the projection portions 520 on which the coating material 50M was supplied, the coating material 50M is transferred to the green tire 1G during vulcanization (step S40). Accordingly, a coating film of the coating material 50M is formed on the inner surfaces of the grooves in the tread rubber of the tire (step S50). The inner surfaces of the grooves in the tread rubber are covered in a coating film.

Figure 6:
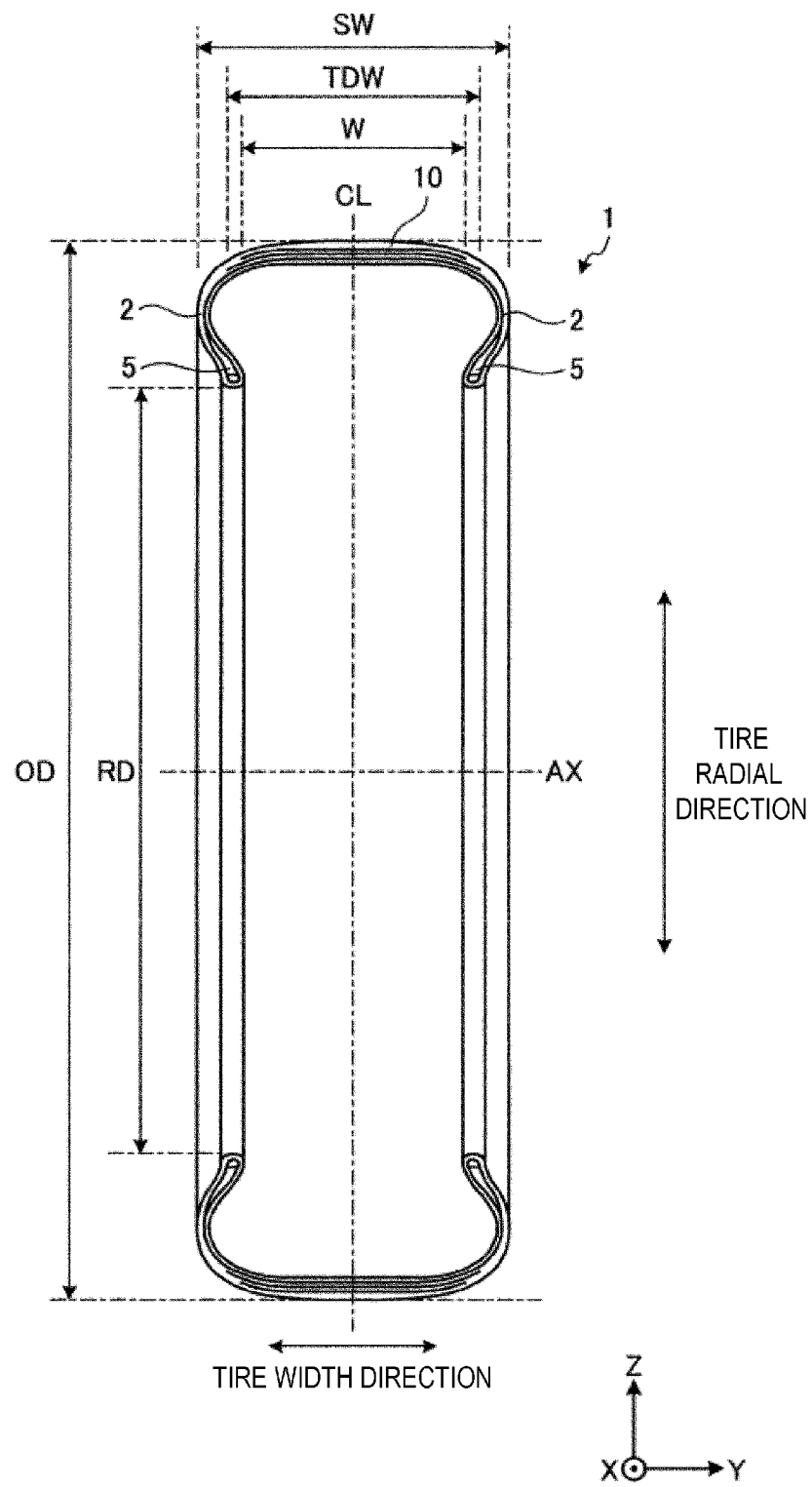
FIG. 6 is a cross-sectional view illustrating an example of a tire according to the first embodiment.
Figure 7:
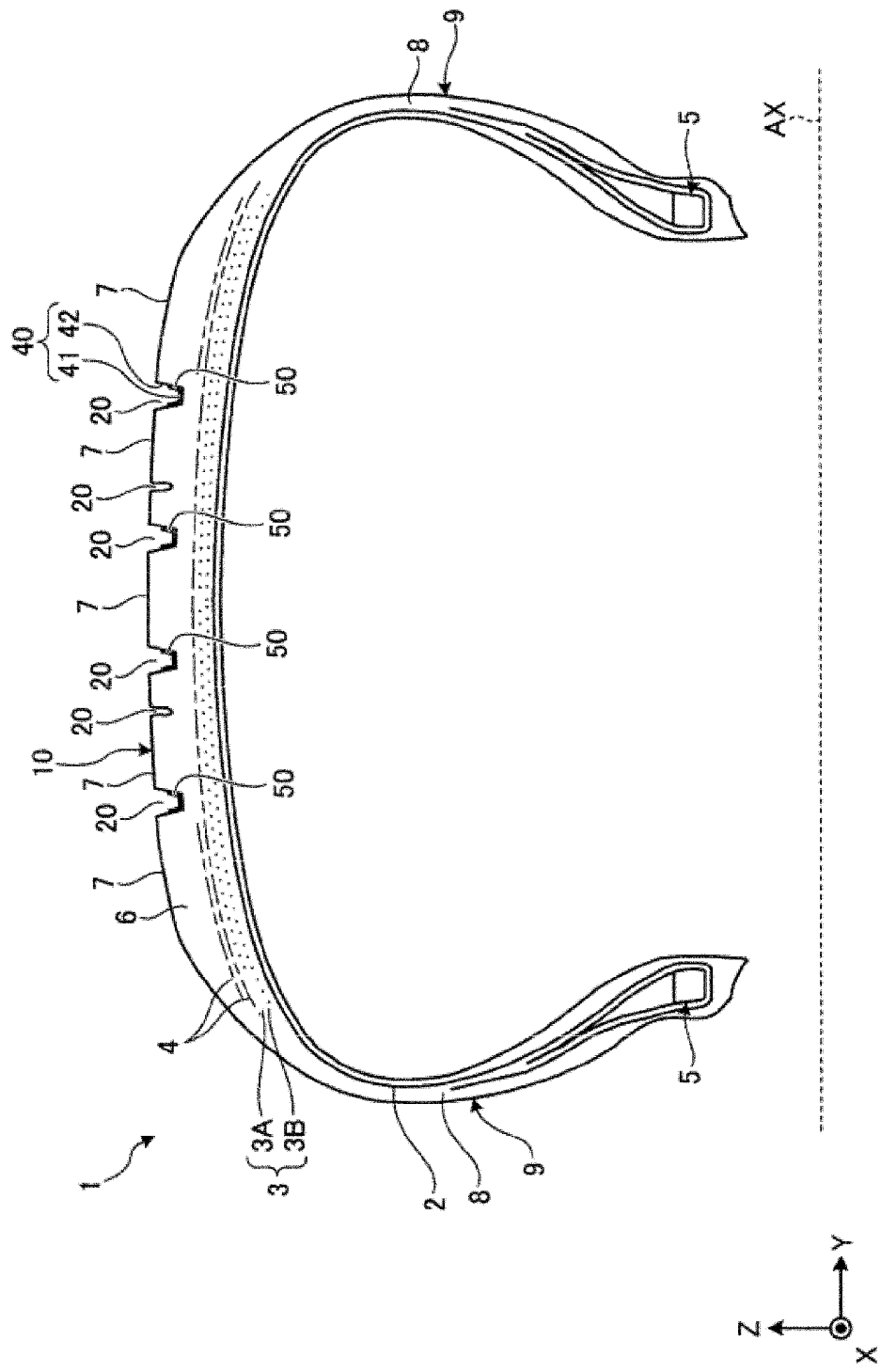
FIG. 7 is a cross-sectional view in which a portion of the tire according to the first embodiment is enlarged.

FIG. 6 is a cross-sectional view illustrating an example of a tire 1 according to the present embodiment. FIG. 7 is a cross-sectional view in which a portion of the tire 1 according to the present embodiment is enlarged. The tire 1 illustrated in FIGS. 6 and 7, is a tire manufactured using the manufacturing device 1000. The tire 1 is rotatable about a center axis (rotation axis) AX. FIGS. 6 and 7 illustrate the meridian cross-section of the tire 1 taken along the center axis AX. The center axis AX of the tire 1 is orthogonal to an equatorial plane CL of the tire 1. "Equatorial plane CL" refers to a plane that passes through the center of the tire 1 in the tire width direction.

In the description below, an X-Y-Z Cartesian coordinates system is used, and a positional relationship of each portion is described with reference to the X-Y-Z Cartesian coordinates system. A direction in a horizontal plane is defined as an X-axis direction, a direction orthogonal to the X-axis direction in the horizontal plane is defined as a Y-axis direction, and a direction orthogonal to each of the X-axis direction and the Y-axis direction is defined as a Z-axis direction. Further, rotational (inclination) directions around the X axis, Y axis, and the Z axis are defined as directions θX, θY, and θZ, respectively. In the present embodiment, a center axis AX of the tire 1 is parallel to the Y axis. The equatorial plane CL passes through the center of the tire 1 in the Y-axis direction. Direction θY is the rotation direction centered about the center axis AX. The X-axis direction and the Z-axis direction are radiation directions with respect to the center axis AX. The (road surface) ground on which the tire 1 runs (rolls) is roughly parallel to an XY plane.

The tire 1 includes a carcass portion 2, a belt layer 3, a belt cover 4, bead portions 5, a tread portion 10, and sidewall portions 9. The tread portion 10 is disposed in a tread rubber 6. The sidewall portions 9 are disposed in the sidewall rubber 8. The carcass portion 2, the belt layer 3, and the belt cover 4 each include cords. Cords are reinforcing members. Cords may also be referred to as wires. Layers such as the carcass portion 2, the belt layer 3, and the belt cover 4 that include reinforcing members may be referred to as cord layers or reinforcing member layers.

The carcass portion 2 is a reinforcing member that forms the framework of the tire 1. The carcass portion 2 includes cords. The cords of the carcass portion 2 may be referred to as carcass cords. The carcass portion 2 functions as a pressure vessel when the tire 1 is filled with air. The carcass portion 2 is supported by the bead portions 5. The bead portions 5 are disposed on both sides of the carcass portion 2 in the Y-axis direction. The carcass portion 2 is folded back at the bead portions 5. The carcass portion 2 includes carcass cords made of organic fibers and rubber that covers the carcass cords. Note that the carcass portion 2 may include carcass cords made of synthetic resin fibers. The carcass portion 2 may include carcass cords made of polyester, carcass cords made of nylon, carcass cords made of aramid, and carcass cords made of rayon.

The belt layer 3 is a reinforcing member that holds the form of the tire 1. The belt layer 3 includes cords. The cords of the belt layer 3 may be referred to as belt cords. The belt layer 3 is disposed between the carcass portion 2 and the tread rubber 6. The belt layer 3 includes, for example, steel belt cords or other metal fiber belt cords and rubber that covers the belt cords. Note that the belt layer 3 may include belt cords made of organic fibers. In the present embodiment, the belt layer 3 includes a first belt ply 3A and a second belt ply 3B. The first belt ply 3A and the second belt ply 3B are layered so that the direction of the cords of the first belt ply 3A and the second belt ply 3B intersect.

The belt cover 4 is a reinforcing member that protects and reinforces the belt layer 3. The belt cover 4 includes cords. The cords of the belt cover 4 may be referred to as cover cords. The belt cover 4 is disposed outward of the belt layer 3 with respect to the center axis AX of the tire 1. The belt cover 4 includes, for example, steel cover cords or other metal fiber cover cords and rubber that covers the cover cords. Note that the belt cover 4 may include cover cords made of organic fibers.

The bead portions 5 are reinforcing members that fix both ends of the carcass portion 2. The bead portions 5 fix the tire 1 to a rim. The bead portions 5 are each a bundle of steel wires. Note that the bead portions 5 may be a bundle of carbon steel.

The tread rubber layer 6 protects the carcass portion 2. The tread rubber 6 includes the tread portion 10 and a plurality of grooves 20 provided in the tread portion 10. The tread portion 10 includes a contact patch 7 that comes into contact with the road surface. The tread rubber 6 includes the contact patch 7. The grooves 20 are provided in the tread rubber 6. The grooves 20 each include an inner surface 40. The tread portion 10 includes land portions disposed between the grooves 20. The contact patch 7 is disposed on the land portions.

In the present embodiment, the tire 1 includes a coating film 50 disposed covering at least a portion of the inner surface 40 of each of the grooves 20. The coating film 50 blocks air from coming into contact with the inner surface 40 and reduces the amount of ultraviolet light the inner surface 40 is exposed to. As described above, the coating film 50 is formed using the projection portions 520 of the vulcanization mold 500. The inner surfaces 40 of the grooves 20 each include a bottom surface 41 and side surfaces 42. The side surfaces 42 are disposed connecting the bottom surface 41 and the contact patch 7. In the present embodiment, the coating film 50 is disposed covering at least the bottom surface 41.

The sidewall rubbers 8 protect the carcass portion 2. The sidewall rubbers 8 are disposed on both sides of the tread rubber 6 in the tire width direction. The sidewall rubbers 8 include the sidewall portions 9 disposed on both sides of the tread portion 10 in the tire width direction.

In the present embodiment, the tire outer diameter is denoted by OD. The tire rim diameter is denoted by RD. The total tire width is denoted by SW. The tread contact width is denoted by W. The developed tread width is denoted by TDW.

"Tire outer diameter OD" refers to the diameter of the tire 1 when mounted on a regular rim, inflated to the regular internal pressure, and no load is applied.

"Tire rim diameter RD" refers to the rim diameter of the wheel fitted with the tire 1. The tire rim diameter RD is equivalent to the tire inner diameter.

"Total tire width SW" refers to the maximum dimension in the direction parallel to the center axis AX of the tire 1 when mounted on a regular rim, inflated to the regular internal pressure, and no load is applied. In other words, "total tire width SW" refers to the distance from the furthest portion to the +Y side of the sidewall portion 9 disposed on the +Y side of the tread rubber 6 to the furthest portion to the −Y side of the sidewall portion 9 disposed to the −Y side. In embodiments in which the sidewall portions 9 are provided with structural components projecting from the surfaces of the sidewall portions 9, "total tire width SW" refers to the maximum dimension in the Y-axis direction of the tire 1 including these structural components. The structural components projecting from the surfaces of the sidewall portions 9 may include at least one of alphanumerics, marks, or designs formed in at least a portion of the sidewall rubber 8 in the sidewall portions 9.

In the present embodiment, "tread contact width W" refers to the maximum value of the ground contact width in the direction parallel to the center axis AX of the tire 1 measured when mounted on a regular rim, inflated to the regular internal pressure, and placed vertically upon a flat surface with a regular load applied.

In the present embodiment, "developed tread width TDW" refers to the linear distance between both ends of the tread portion 10 of the tire 1 in a developed view, measured when the tire 1 is mounted on a regular rim, inflated to the regular internal pressure, and no load is applied.

"Regular rim" is a rim defined by a standard for each tire 1 according to a system of standards that includes standards on which tires 1 are based, and refers to a "standard rim" in the case of Japan Automobile Tyre Manufacturers Association (JATMA), refers to a "Design Rim" in the case of Tire and Rim Association (TRA), and refers to a "Measuring Rim" in the case of European Tyre and Rim Technical Organisation (ETRTO). If the tire 1 is an original equipment tire, the genuine wheel upon which the tire is mounted is used.

"Regular internal pressure" is the air pressure defined by standards for each tire 1 according to a system of standards that includes standards on which tires 1 are based, and refers to a "maximum air pressure" in the case of JATMA, refers to the maximum value in the table of "TIRE ROAD LIMITS AT VARIOUS COLD INFLATION PRESSURES" in the case of TRA, and refers to the "INFLATION PRESSURE" in the case of ETRTO. However, the air pressure which is displayed on the vehicle is used in a case where the tire 1 is an original equipment tire.

"Regular load" is the load defined by standards for each tire 1 according to a system of standards that includes standards on which tires 1 are based, and refers to "maximum load capacity" in the case of JATMA, to the maximum value in the table of "TIRE ROAD LIMITS AT VARIOUS COLD INFLATION PRESSURES" in the case of TRA, and to "LOAD CAPACITY" in the case of ETRTO. If the tire 1 is for use with a passenger vehicle, a load corresponding to 88% of the loads described above is used. In the case of the tire 1 being an original equipment tire, the wheel load is obtained by dividing the front and rear axle loads stated in the vehicle inspection certificate of the vehicle by the number of tires.

Figure 8:
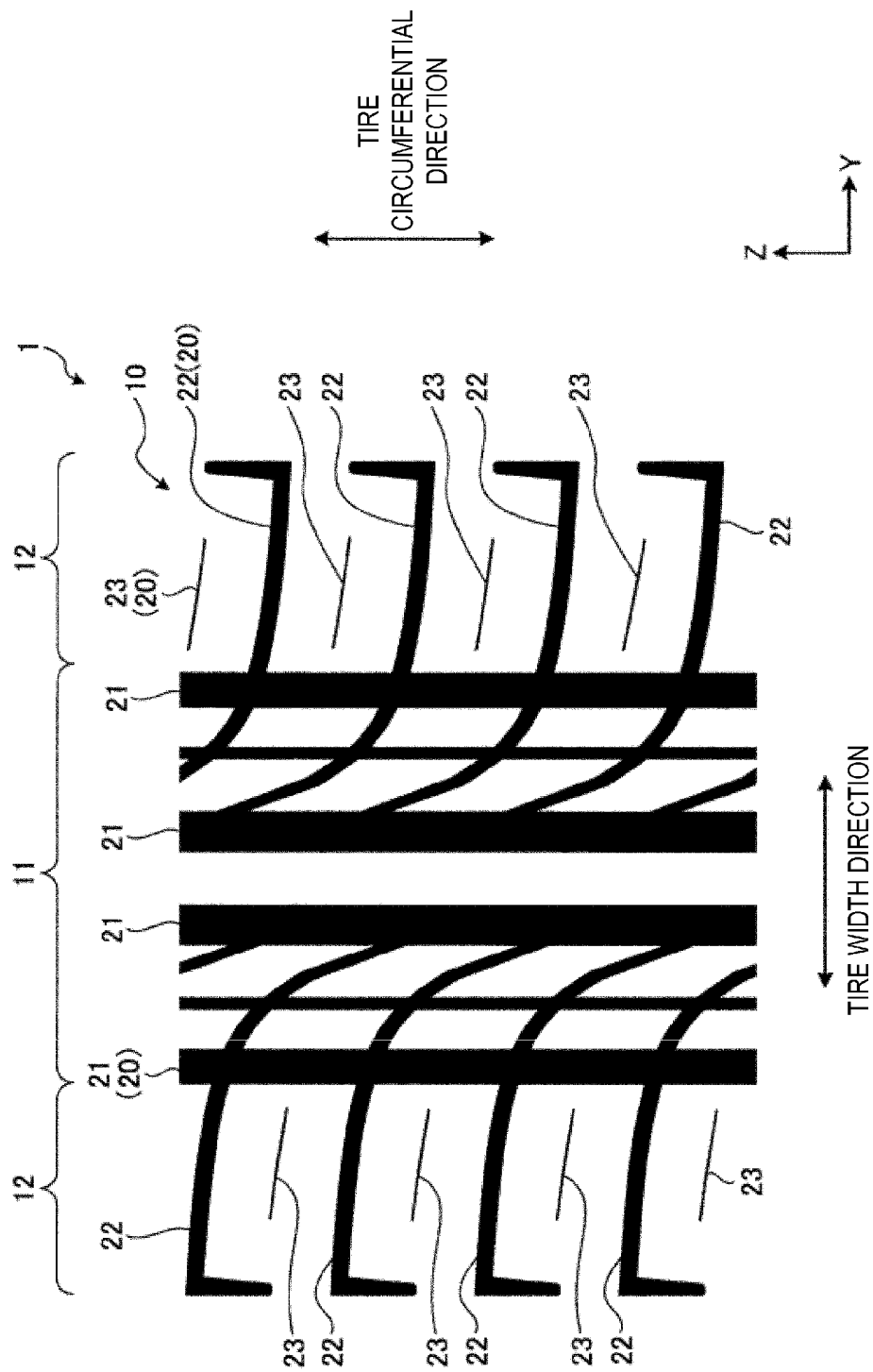
FIG. 8 is a drawing illustrating an example of a tread portion of the tire according to the first embodiment.

FIG. 8 is a drawing illustrating an example of the tread portion 10 of the tire 1. As illustrated in FIG. 8, the tire 1 includes grooves 20 provided in the tread portion 10. The grooves 20 includes main grooves (circumferential grooves) 21 that extend in the tire circumferential direction, lug grooves (lateral grooves) 22, each with at least a portion thereof that extends in the tire width direction, and sipes 23, each with at least a portion thereof that extends in the tire width direction. Land portions are provided at the perimeter of the grooves 20. The land portions are provided between adjacent grooves 20. The tread portion 10 includes a plurality of land portions.

The main grooves 21 are formed in the tire circumferential direction. At least a portion of each of the main grooves 21 is provided in a center portion 11 of the tread portion 10 of the tire 1. A slip sign (tread wear indicator) is provided inside the main grooves 21. The slip sign indicates the terminal stage of wear. The main grooves 21 have a width of 4.0 mm or greater. The main grooves 21 may have a width of 4.0 mm or greater and a depth of 5.0 mm or greater. In the example illustrated in FIG. 3, the tire 1 includes four main grooves 21.

At least a portion of each of the lug grooves 22 is formed in the tire width direction. At least a portion of each of the lug grooves 22 is provided in a shoulder portion 12 of the tread portion 10 of the tire 1. Two shoulder portions 12 are disposed on both sides (+Y side and −Y side) of the center portion 11 in the tire width direction (Y-axis direction). The lug grooves 22 have a width of 1.5 mm or greater. The lug grooves 22 may have a depth of 4.0 mm or greater, and in a portion thereof have a depth of less than 4.0 mm.

A least a portion of each of the sipes 23 is formed in the tire width direction. The sipes 23 are formed in the land portions of the tire 1. In the present embodiment, at least a portion of each of the sipes 23 is provided in the shoulder portions 12 of the tread portion 10 of the tire 1. The sipes 23 have a width of less than 1.5 mm.

Figure 9:
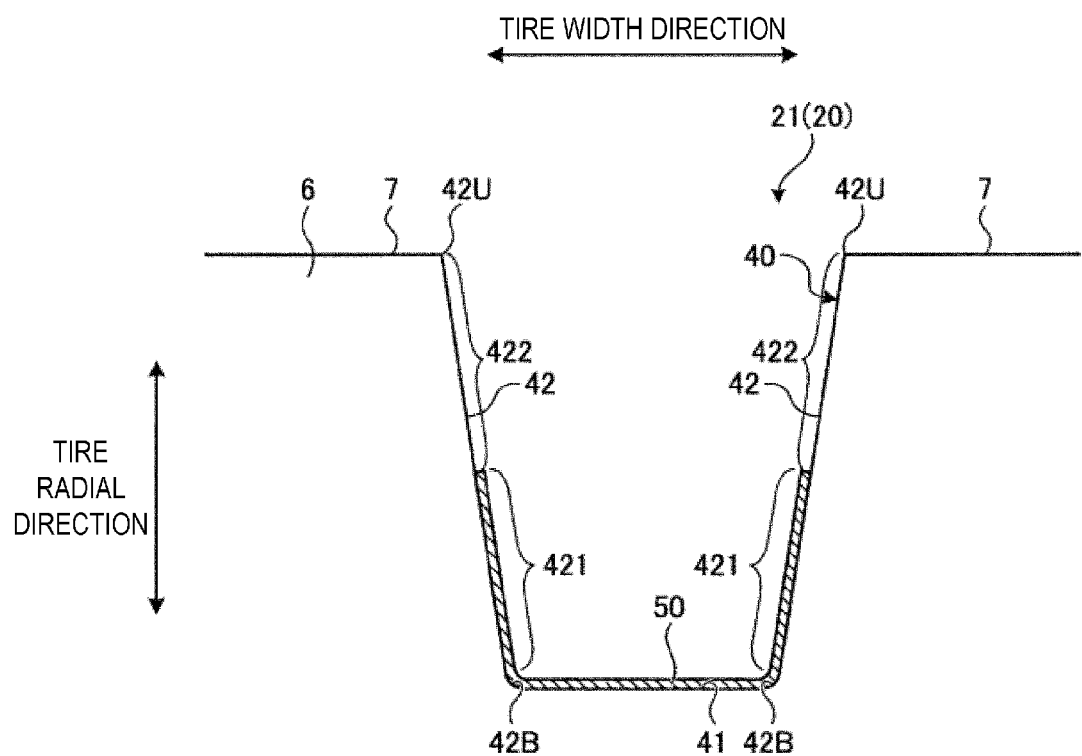
FIG. 9 is a cross-sectional view illustrating a groove of the pneumatic tire according to the first embodiment.

FIG. 9 is a cross-sectional view illustrating an example of a groove 20 provided in the tread rubber 6 according to the present embodiment. The description below is applicable to an embodiment in which the groove 20 is considered a main groove 21. Note that the groove 20 may be a lug groove 22 or a sipe 23. The groove 20 may be an inclined groove that extends at an incline with respect to both the tire circumferential direction and the tire width direction.

As illustrated in FIG. 9, the tread rubber 6 includes the contact patch 7. The main groove 21 is provided in the tread rubber 6. The main groove 21 includes the inner surface 40. The inner surface 40 includes the bottom surface 41 and the side surfaces 42. The side surfaces 42 are disposed connecting an end portion of the bottom surface 41 and end portions of the contact patch 7.

In the description below, end portions 42B of the side surfaces 42 that connect to the bottom surface 41 are also referred to as "inner end portions 42B" when appropriate. End portions 42U of the side surfaces 42 that connect to the contact patch 7 are also referred to as "outer end portions 42U" when appropriate.

The coating film 50 is disposed covering at least a portion of the inner surface 40. The coating film 50 is disposed covering at least the bottom surface 41. In the present embodiment, the coating film 50 is disposed covering the bottom surface 41 and portions of the side surfaces 42. In the present embodiment, the coating film 50 is disposed covering inner regions 421 of the side surfaces 42 including the inner end portions 42B. The coating film 50 is not disposed in outer regions 422 of the side surfaces 42 disposed outward of the inner regions 421 in the tire radial direction. The surface of the tread rubber 6 is exposed in the outer regions 422 of the side surfaces 42.

The coating film 50 reduces the amount of ultraviolet light (intensity) the inner surface 40 is exposed to, the inner surface 40 being the surface of the tread rubber 6. The coating film 50 reduces the amount of ultraviolet light the inner surface 40 is exposed to per unit time. The coating film 50 reduces the strength of the ultraviolet light the inner surface 40 is exposed to. Additionally, the coating film 50 reduces exposure of the inner surface 40 to air, the inner surface 40 being the surface of the tread rubber 6.

The coating film 50 includes, for example, a resin composition with urethane as a main component and a carbon black contained in the resin composition. The carbon black is capable of ultraviolet light absorption. By forming the coating film 50 with the resin composition containing the carbon black, the coating film 50 exhibits high ultraviolet light shielding functionality (ultraviolet light absorption functionality) and air barrier functionality. Thus, the amount of ultraviolet light the inner surface 40 is exposed to is reduced, and exposure of the inner surface 40 to ozone in the air is suppressed.

Note that the coating film 50 may include, for example, a resin composition with urethane as a main component and a pigment contained in the resin composition. The coating film 50 formed with the resin composition containing the pigment also exhibits high ultraviolet light shielding functionality (ultraviolet light absorption functionality) and air barrier functionality.

The coating film 50 may include a resin composition with urethane as a main component and at least one of: a benzotriazole-based ultraviolet light absorbing agent, a benzophenone-based ultraviolet light absorbing agent, a salicylate-based ultraviolet light absorbing agent, a cyanoacrylate-based ultraviolet light absorbing agent, a nickel-based ultraviolet light absorbing agent, a triazine-based ultraviolet light absorbing agent, or a hindered amine-based light stabilizer.

Note that of the ultraviolet light absorbing agents described above, in particular the benzotriazole-based ultraviolet light absorbing agent is preferable, and a hydroxyphenyl benzotriazole derivative is preferable.

The coating film 50 formed with a resin composition containing at least one of a benzotriazole-based ultraviolet light absorbing agent, a benzophenone-based ultraviolet light absorbing agent, a salicylate-based ultraviolet light absorbing agent, a cyanoacrylate-based ultraviolet light absorbing agent, a nickel-based ultraviolet light absorbing agent, a triazine-based ultraviolet light absorbing agent, or a hindered amine-based light stabilizer exhibiting high ultraviolet light shielding functionality (ultraviolet light absorption functionality) and air barrier functionality. Additionally, the coating film 50 can sufficiently deform in accordance with the tread rubber 6 when it deforms.

Examples of the ultraviolet light absorbing agent (additive) contained in the resin composition include at least one of: ethylhexyl methoxycinnamate, octyl methoxycinnamate, 2-ethylhexyl para-dimethylaminobenzoic acid, octocrylene, ethylhexyl triazone, oxybenzone-(number), phenyl-benzimidazole-sulfonic acid, t-butyl methoxy dibenzoyl methane, diethylamino hydroxydibenzoyl hexyl benzoate, bis-ethylhexyloxyphenol methoxyphenyl triazine, methylene bis-benzotriazolyl tetramethylbutylphenol, dimethoxybenzylidene dioxoimidazolidine propionate octyl, diethylamino hydroxybenzoyl hexyl benzoate, t-butyl methoxydibenzoyl methane, or octyltriazone.

Additionally, the coating film 50 may include, a resin composition with urethane as a main component and a titanium oxide contained in the resin composition. The titanium oxide is capable of reflecting (scattering) ultraviolet light. By forming the coating film 50 with the resin composition containing the titanium oxide, the coating film 50 exhibits high ultraviolet light shielding functionality (ultraviolet light reflecting functionality) and air barrier functionality. Thus, the amount of ultraviolet light the inner surface 40 is exposed to is reduced, and exposure of the inner surface 40 to ozone in the air is suppressed.

Note that the coating film 50 may include, for example, a resin composition with urethane as a main component and a zinc oxide contained in the resin composition. The coating film 50 formed with the resin composition containing the zinc oxide also exhibits high ultraviolet light shielding functionality (ultraviolet light reflecting functionality) and air barrier functionality.

The resin composition may include an ester-based urethane as a main component, an ether-based based urethane as a main component, or a polycarbonate-based urethane as a main component. In the present embodiment, the resin composition includes a polycarbonate-based urethane as a main component. The coating film 50 that includes a resin composition with a polycarbonate-based urethane as a main component can sufficiently deform in accordance with the tread rubber 6 when it deforms.

In the present embodiment, the material and thickness of the coating film 50 is set so that the transmittance of the coating film 50 with respect to ultraviolet light having wavelengths from 290 nm to 380 nm is 0.5 or less. Note that transmittance of the coating film 50 is as per Japanese Industrial Standards (JIS) K 7105.

As the transmittance (JIS K 7105) of the coating film 50 with respect to ultraviolet light having wavelengths from 290 nm to 380 nm is 0.5 or less, the tire 1 can have a long service life, and groove cracking can be sufficiently suppressed despite the tread rubber 6 being exposed to ultraviolet light.

In the present embodiment, the thickness of the coating film 50 is from 5 μm to 120 μm. Accordingly, the coating film 50 can sufficiently deform in accordance with the tread rubber 6 when it deforms while retaining ultraviolet light shielding functionality and air barrier functionality. In other words, if the thickness of the coating film 50 is less than 5 μm, the obtained ultraviolet light shielding functionality and air barrier functionality may be insufficient. If the thickness of the coating film 50 is greater than 120 μm, the coating film 50 is unable to deform in accordance with the tread rubber 6 when it deforms, and the coating film 50 is likely to separate from the inner surface 40 of the tread rubber 6. The coating film 50 with a thickness of from 5 μm to 120 μm suppresses separation from the tread rubber 6 while retaining ultraviolet light shielding functionality and air barrier functionality.

Note that the thickness of the coating film 50 is preferably from 8 μm to 100 μm. The coating film 50 with a thickness of from 8 μm to 100 μm sufficiently suppresses separation from the tread rubber 6 while exhibiting high ultraviolet light shielding functionality and air barrier functionality.

Figure 10:
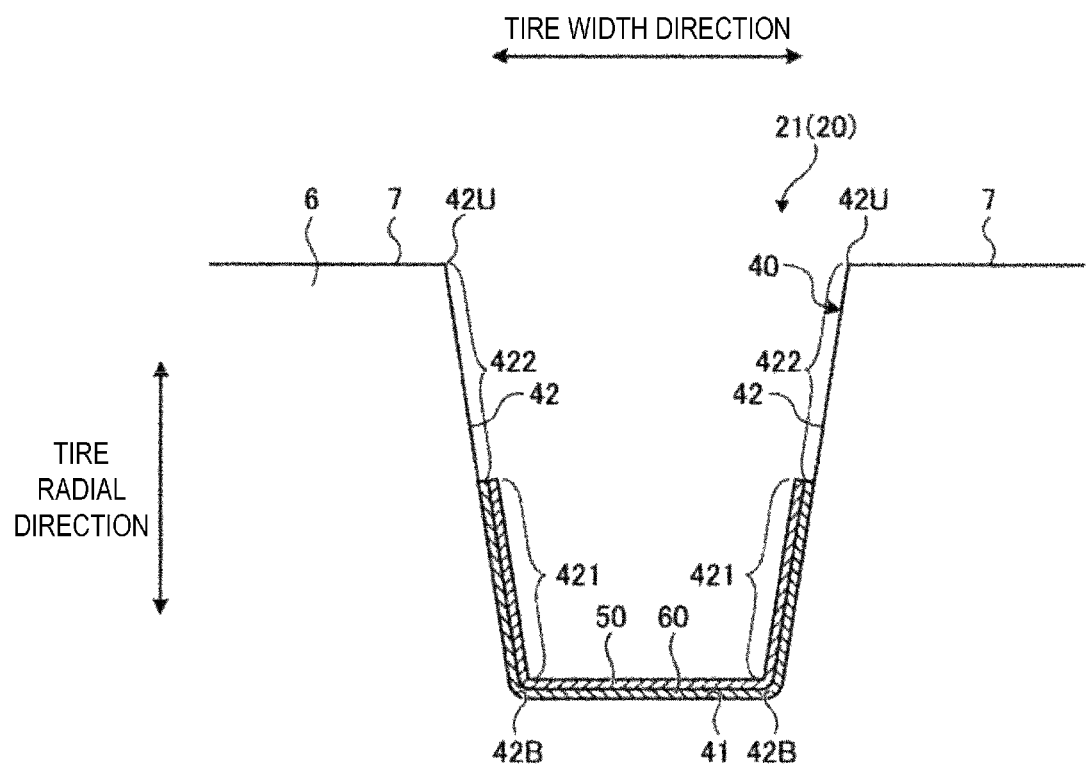
FIG. 10 is a cross-sectional view illustrating an example of a groove of the tire according to the first embodiment.

FIG. 10 illustrates an example in which a primer film 60 is disposed between the inner surface of the main groove 21 (groove 20) and the coating film 50. The primer film 60 has a water-based acrylic emulsion as a main component. The primer film 60 increases the adhesive strength of the inner surface 40 to the coating film 50, the inner surface 40 being the surface of the tread rubber 6. In the present embodiment, the coating film 50 is in contact with the inner surface 40 with the primer film 60 disposed therebetween.

In the present embodiment, the thickness of the primer film 60 is from 3 μm to 20 μm. Accordingly, adhesive functionality of the primer film 60 can be retained, and the primer film 60 can deform in accordance with the tread rubber 6 when it deforms. In other words, if the thickness of the primer film 60 is less than 3 μm, sufficient adhesive functionality is unlikely to be obtained. If the thickness of the primer film 60 is greater than 20 μm, the primer film 60 is unable to sufficiently deform in accordance with the tread rubber 6 when it deforms, and the primer film 60 is likely to separate from the inner surface 40 of the tread rubber 6. The primer film 60 with a thickness of from 3 μm to 20 μm suppresses separation from the tread rubber 6 while retaining adhesive functionality.

Note that the primer film 60 may be omitted. In other words, as illustrated in FIG. 9, the coating film 50 may be directly in contact with the inner surface 40.

In the present embodiment, the center line average surface roughness (Ra 75) of the inner surface 40 is from 1 μm to 100 μm. The center line average surface roughness (Ra75) is as per JIS B0601:2001. The center line average surface roughness can be measured with a laser-type non-contact surface roughness measuring device. By the inner surface 40 having a predetermined surface roughness, the adhesiveness of the inner surface 40 to the coating film 50 or the primer film 60 is improved.

In the present embodiment, the surfaces of the projection portions 520 of the vulcanization mold 500 used in vulcanization of the tire 1 can be processed so that the inner surfaces 40 of the main grooves 21 (grooves 20) are given the surface roughness described above. By the form of the surface of the projection portions 520 of the vulcanization mold 500 being transferred to the inner surfaces 40 of the grooves 20, the inner surfaces 40 can be given the predetermined surface roughness.

Figure 11:
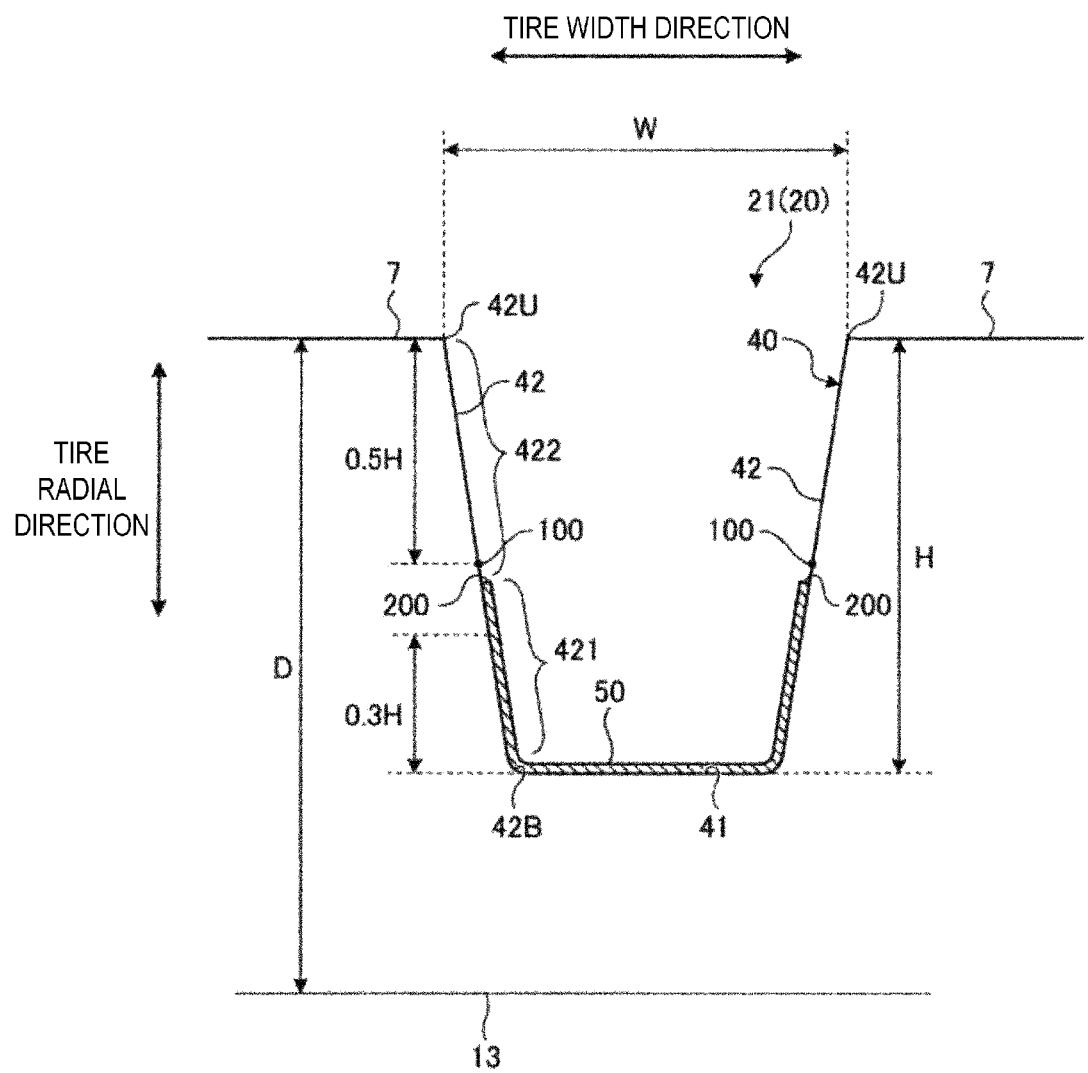
FIG. 11 is a drawing illustrating an example of a groove of the tire according to the first embodiment.

Next, the relationship between the dimensions of the main grooves 21 (grooves 20) according to the present embodiment and the coating film 50 will be described with reference to FIG. 11. FIG. 11 is a cross-sectional view illustrating an example of main groove 21 according to the present embodiment.

As illustrated in FIG. 11, the depth of the main groove 21 is denoted by H, the width of the main groove 21 is denoted by W, the thickness of the tread rubber 6 is denoted by D. The main groove 21 is formed such that the following conditions are satisfied:

$$H \geq 0.3D \quad (1)$$

$$H/W \leq 5 \quad (2).$$

The main groove 21 satisfies the conditions of both Formula (1) and Formula (2).

The depth H of the main groove 21 is the depth H when the tire 1 is new (unworn). The width W of the main groove 21 is the width W when the tire 1 is new. The thickness D of the tread rubber 6 is the thickness D when the tire 1 is new.

As illustrated in FIG. 11, the depth H of the main groove 21 is the distance from the contact patch 7 to the bottom surface 41 in the tire radial direction. The depth H is substantially equivalent to the distance from the inner end portions 42B to the outer end portions 42U when the tire 1 is new.

As illustrated in FIG. 11, the width W of the main groove 21 is the distance (distance in the tire width direction) from the outer end portion 42U of the side surface 42 on one side in the tire circumferential direction to the outer end portion 42U of the side surface 42 on the other side.

As illustrated in FIG. 11, the thickness D of the tread rubber 6 is the distance from the contact patch 7 to an inner surface 13 of the tread rubber 6 in the tire radial direction. In the present embodiment, the inner surface 13 of the tread rubber 6 includes a boundary face with the belt cover 4.

For grooves 20 that satisfy the conditions of Formula (1) and Formula (2), the inner surface 40 (especially the bottom surface 41) is highly likely to be exposed to ultraviolet light (direct sunlight) and suffer from groove cracking. Formula (1) dictates that the width W is great relative to the depth H, thus the bottom surface 41 is susceptible to exposure from direct sunlight. Formula (2) dictates that the groove 20 is deep relative to the thickness D of the tread rubber 6, thus the distance between the bottom surface 41 and the inner surface 13 is small. Accordingly, the bottom surface 41 of the groove 20 that satisfies the conditions of Formula (1) and Formula (2) is susceptible to exposure from ultraviolet light, and the bottom surface 41 is highly likely to suffer from groove cracking.

In particular, in embodiments in which the groove 20 is the main groove 21, the inner surface 40 is highly susceptible to exposure from ultraviolet light. The main grooves 21 are circumferential grooves with a width W of 4.0 mm or greater. The lug grooves 22 are lateral grooves with a width of 1.5 mm or greater. The sipes 23 are lateral grooves with a width of less than 1.5 mm. Note that the width of the lug grooves 22 is the distance between outer end portions of the side surfaces of the lug grooves 22 (the distance in the tire circumferential direction, for example). The width of the sipes 23 is the distance between the outer end portions of the side surfaces of the sipes 23 (the distance in the tire circumferential direction, for example).

In other words, the main grooves 21 mainly have a greater width than the lug grooves 22 and the sipes 23. Thus, the amount of ultraviolet light the inner surfaces 40 of the main grooves 21 are exposed to is mainly more than the amount of ultraviolet light the inner surfaces 40 of the lug grooves 22 are exposed to.

In the present embodiment, out of the grooves 20 provided on the tire 1, the coating film 50 is provided on the inner surfaces 40 of at least the grooves 20 (including the main grooves 21, lateral grooves 22, and sipes 23) that satisfy the conditions of Formula (1) and Formula (2). Thus, groove cracking caused by exposure to ultraviolet light is suppressed.

Additionally, in the present embodiment, out of the grooves 20 including the main grooves 21, lug grooves 22, and sipes 23, the coating film 50 is provided on the inner surfaces 40 of at least the main grooves 21. In the present embodiment, of the grooves 20 provided on the tire 1, the coating film 50 is provided on the inner surfaces 40 of at least the main grooves 21 that satisfy the conditions of Formula (1) and Formula (2). Thus, groove cracking caused by exposure to ultraviolet light is suppressed.

In the present embodiment, the coating film 50 is disposed covering the inner surface 40 on the bottom surface 41 side of positions 100 located at 0.5H from the contact patch 7 in the depth direction of the groove 20, where H is the depth of the groove 20 when the tire 1 is new. The positions 100 are positions on the side surfaces 42.

In other words, in the present embodiment, outermost positions 200 of the coating film 50 in the tire radial direction are disposed inward of the positions 100 of the side surfaces 42 in the tire radial direction.

The coating film 50 is disposed covering the inner regions 421 of the side surfaces 42 including the inner end portions 42B. The inner regions 421 are regions located inward of the positions 100 in the tire radial direction. The coating film 50 is not disposed in the outer regions 422 of the side surfaces 42 disposed outward of the inner regions 421 in the tire radial direction. The outer regions 422 include regions located outward of the positions 100 in the tire radial direction.

If the coating film 50 is disposed in regions located outward of the positions 100 in the tire radial direction, the coating film 50 is likely to come into contact with the ground when the tire 1 is running. Additionally, when the tire 1 runs, the tire 1 is worn. Accordingly, if the distances between the contact patch 7 and the positions 200 of the coating film 50 are short, the coating film 50 is likely to come into contact with the ground during the early stages of wear of the tire 1.

If the coating film 50 comes into contact with the ground, the coating film 50 degrades, and the coating film 50 is likely to separate from the tread rubber 6.

In the present embodiment, the coating film 50 is not provided near the contact patch 7 when the tire 1 is new. Thus, ultraviolet light shielding functionality and air barrier functionality are retained, and the coating film 50 is prevented from coming into contact with the ground when the tire 1 is new, and during the early and intermediate stages of wear. As a result, degradation of the coating film 50, and separation of the coating film 50 from the tread rubber 6 are suppressed.

Note that in the present embodiment, the coating film 50 is preferably disposed at least on the bottom surface 41. The coating film 50 may not be disposed on the side surfaces 42. Note that the coating film 50 may be disposed between at least the inner end portions 42B (bottom surface 41) of the side surfaces 42 and positions located 0.3H from the inner end portions 42B in the tire radial direction.

Figure 12:
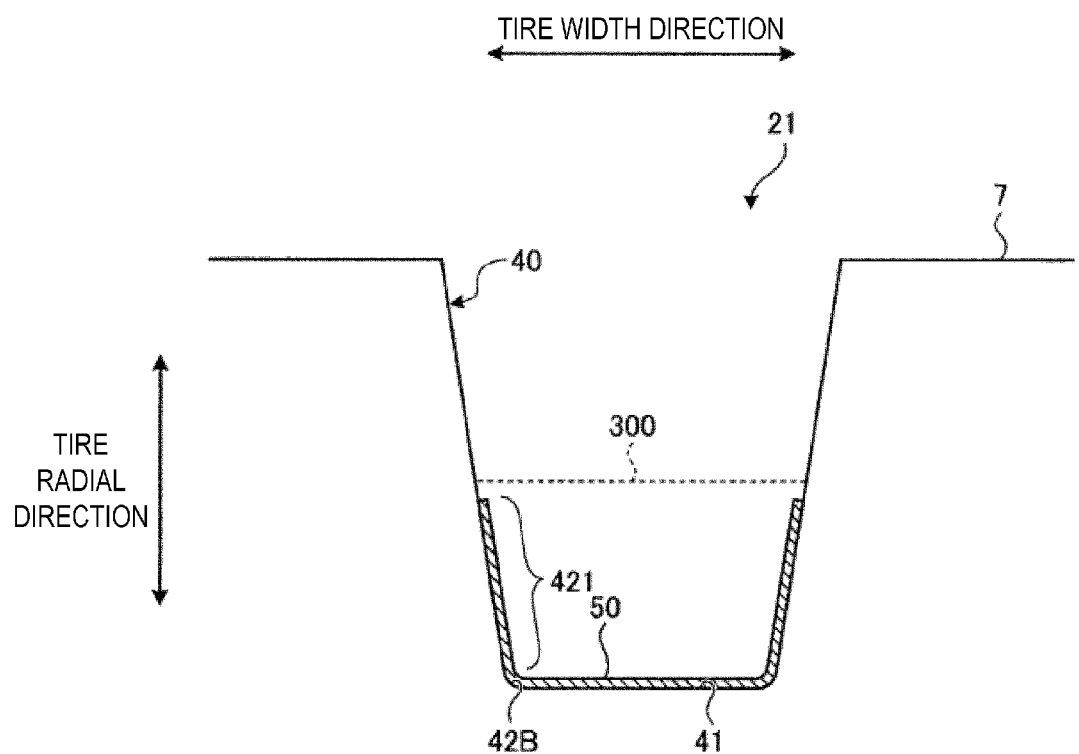
FIG. 12 is a drawing illustrating an example of a groove of the tire according to the first embodiment.

FIG. 12 is a cross-sectional view illustrating a portion of the main groove 21 according to the present embodiment. As described above, a slip sign (tread wear indicator) is provided inside the main groove 21. As illustrated in FIG. 12, a slip sign 300 is provided in the main groove 21. The slip sign 300 indicates the terminal stage of wear.

The coating film 50 may be disposed covering the inner surface 40 on the bottom surface 41 side of the upper line of the slip sign 300 in the depth direction of the main groove 21.

In the example illustrated in FIG. 12, the coating film 50 is prevented from coming into contact with the ground when the tire 1 is new and during the early and intermediate stages of wear. As a result, degradation of the coating film 50, and separation of the coating film 50 from the tread rubber 6 are suppressed.

Note that the coating film 50 may be disposed at the position of the upper line of the slip sign 300.

As described above, according to the present embodiment, the coating film 50 reduces the amount of ultraviolet light the inner surfaces 40 of the grooves 20 of the tread rubber 6 are exposed to. Additionally, exposure of the inner surfaces 40 of the grooves 20 of the tread rubber 6 to air is reduced. Thus, exposure to ozone contained in the air and groove cracking caused by exposure to ultraviolet light are suppressed.

Additionally, according to the present embodiment, the primer film 60 with a water-based acrylic emulsion as a main component is disposed between the inner surface 40 and the coating film 50. As a result, the adhesive strength between the coating film 50 and the inner surface 40 of the tread rubber 6 is improved. Thus, the coating film 50 is provided with sufficient air barrier functionality and ultraviolet light shielding functionality.

Additionally, in the present embodiment, of the grooves 20 provided on the tire 1, the coating film 50 is provided on the inner surfaces 40 of at least the grooves 20 that satisfy the conditions of Formula (1) and Formula (2). Thus, groove cracking caused by exposure to ultraviolet light is effectively suppressed.

Additionally, in the present embodiment, the center line average surface roughness (Ra75) of the inner surface is from 1 μm to 100 μm. As a result, the adhesiveness between the coating film 50 (or the primer film 60) and the inner surface 40 of the tread rubber 6 is improved. By improving the adhesiveness, the coating film 50 is provided with sufficient air barrier functionality and ultraviolet light shielding functionality.

Additionally, in the present embodiment, as described while referencing FIG. 11, the coating film 50 is disposed covering the inner surface 40 on the bottom surface 41 side of positions 100 located at 0.5H from the contact patch 7 in the depth direction of the groove 20, where H is the depth of the groove 20 when the tire 1 is new. As described while referencing FIG. 12, the coating film 50 is disposed covering the inner surface 40 on the bottom surface 41 side of the upper line of the slip sign 300 in the depth direction of the groove 20. In other words, the coating film 50 is disposed positioned away from the contact patch 7 not near the contact patch 7 when the tire 1 is new. As a result, the coating film 50 is prevented from coming into contact with the ground when the tire 1 is new and during the early and intermediate stages of wear while retaining ultraviolet light shielding functionality. As a result, degradation of the coating film 50, and separation of the coating film 50 from the tread rubber 6 are suppressed.

Additionally, according to the present embodiment, the manufacturing device 1000 is capable of smoothly coating the inner surfaces 40 of the grooves 20 of the tread rubber 6 with the coating material 50M by using the projection portions 520 of the vulcanization mold 500. The projection portions 520 include at least one of: main groove projection portions for forming the main grooves 21, lug groove projection portions for forming the lug grooves 22, or sipe projection portions for forming the sipes 23. Accordingly, the manufacturing device 1000 is capable of smoothly coating the inner surfaces 40 of the grooves 20 with varying extension directions and widths. Additionally, according to the present embodiment, the coating material 50M is transferred to the green tire 1G upon vulcanization of the green tire 1G. As a result, the coating film 50 of the coating material 50M and the tread rubber 6 adhere with high adhesive strength.

Additionally, according to the present embodiment, the supply device 600 brings the application member 602 into contact with the projection portions 520 to supply the coating material 50M to the projection portions 520. By using the application member 602, which is not a member of the vulcanization mold 500, the coating material 50M is applied to only the projection portions 520 of the vulcanization mold 500, and undesirable application of the coating material 50M to other portions of the vulcanization mold 500 such as the inner surface 507 is suppressed. Additionally, as the vulcanization mold 500 and the application member 602 are separate members, the application member 602 can be removed from the vulcanization mold 500 after supplying the coating material 50M to the projection portions 520 prior to vulcanization. By performing vulcanization after removing the application member 602 from the vulcanization mold 500, only the coating material 50M applied to the projection portions 520 is transferred to the green tire 1G and the transfer of unnecessary coating material 50M is suppressed.

Additionally, according to the present embodiment, the surface 601 of the application member 602 includes a curved surface projecting toward the projection portions 520. By the surface 601 of the application member 602 being a convex curved surface, the coating material 50M is applied to only the projection portions 520, and undesirable application of the coating material 50M to other portions of the vulcanization mold 500 such as the inner surface 507 is suppressed.

Additionally, according to the present embodiment, the vulcanization mold 500 includes an inner surface 507 for forming the contact patch 7 of the tread rubber 6, the projection portions 520 project from the inner surface 507, and the curvature Ra of the surface 601 of the application member 602 is greater than the curvature Rb of the inner surface 507 of the vulcanization mold 500. As a result, undesirable application of the coating material 50M to other portions of the vulcanization mold 500 is further suppressed.

Additionally, according to the present embodiment, the viscosity of the coating material 50M is from 0.5 Pa·s to 10.0 Pa·s. As a result, the coating material 50M is held by the projection portion 520 with high holding power.

Additionally, according to the present embodiment, the coating film 50 reduces the amount of ultraviolet light the inner surfaces 40 of the grooves 20 of the tread rubber 6 are exposed to, and exposure of the inner surfaces 40 of the grooves 20 of the tread rubber 6 to air is suppressed. As a result, groove cracking caused by exposure to ozone and ultraviolet light is suppressed.

Modified Example 1 of First Embodiment

Figure 13:
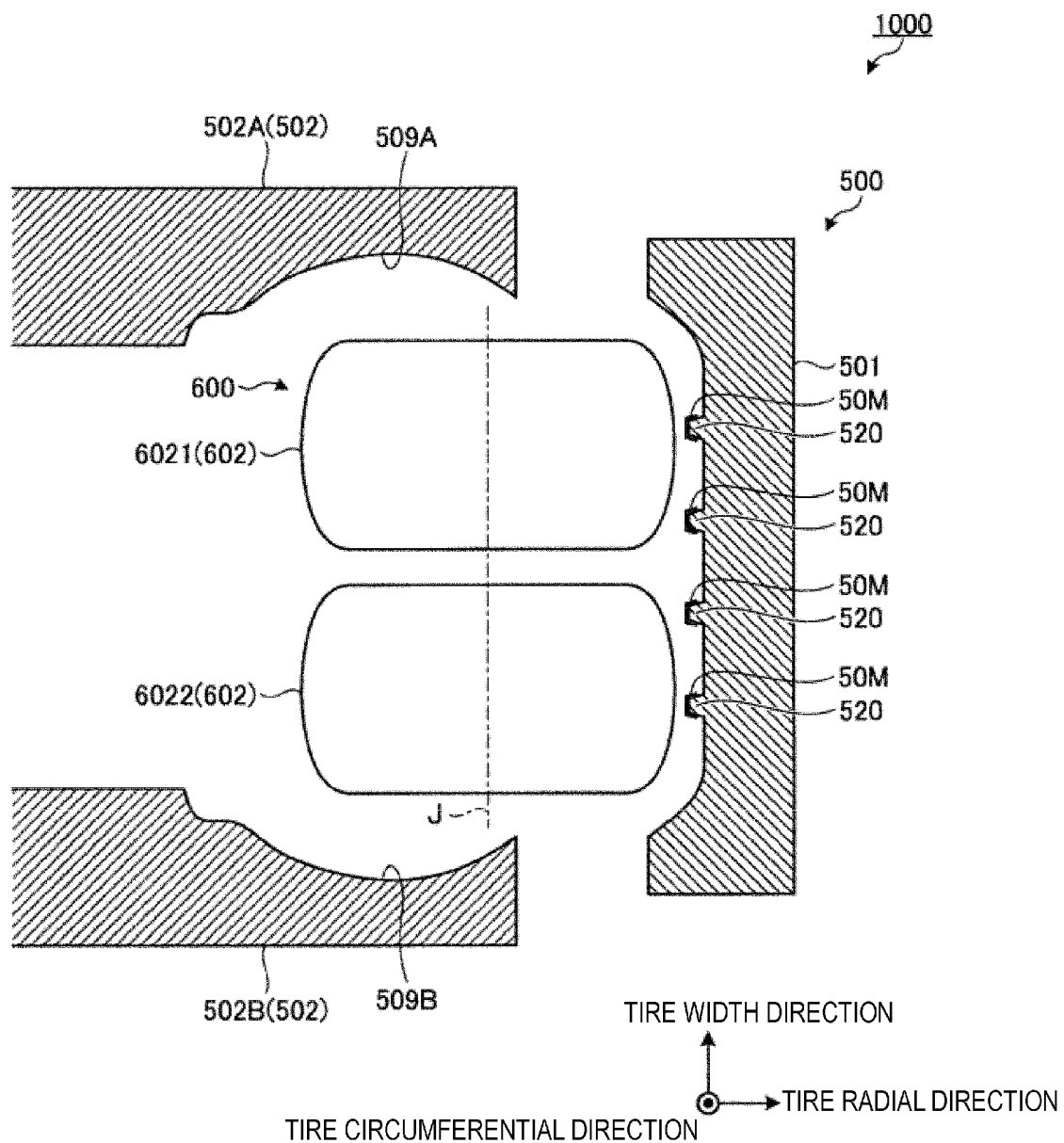
FIG. 13 is a cross-sectional view schematically illustrating a portion of a manufacturing device for a pneumatic tire according to modified example 1 of the first embodiment.

FIG. 13 is a cross-sectional view illustrating a portion of the manufacturing device 1000 according to the present embodiment. As illustrated in FIG. 13, the application member 602 may include a first application member 6021 and a second application member 6022. The first application member 6021 and the second application member 6022 are disposed in the tire width direction and rotate about the same rotation axis J. The first application member 6021 and the second application member 6022 may apply the coating material 50M to the projection portions 520 at the same time.

Modified Example 2 of First Embodiment

Figure 14:
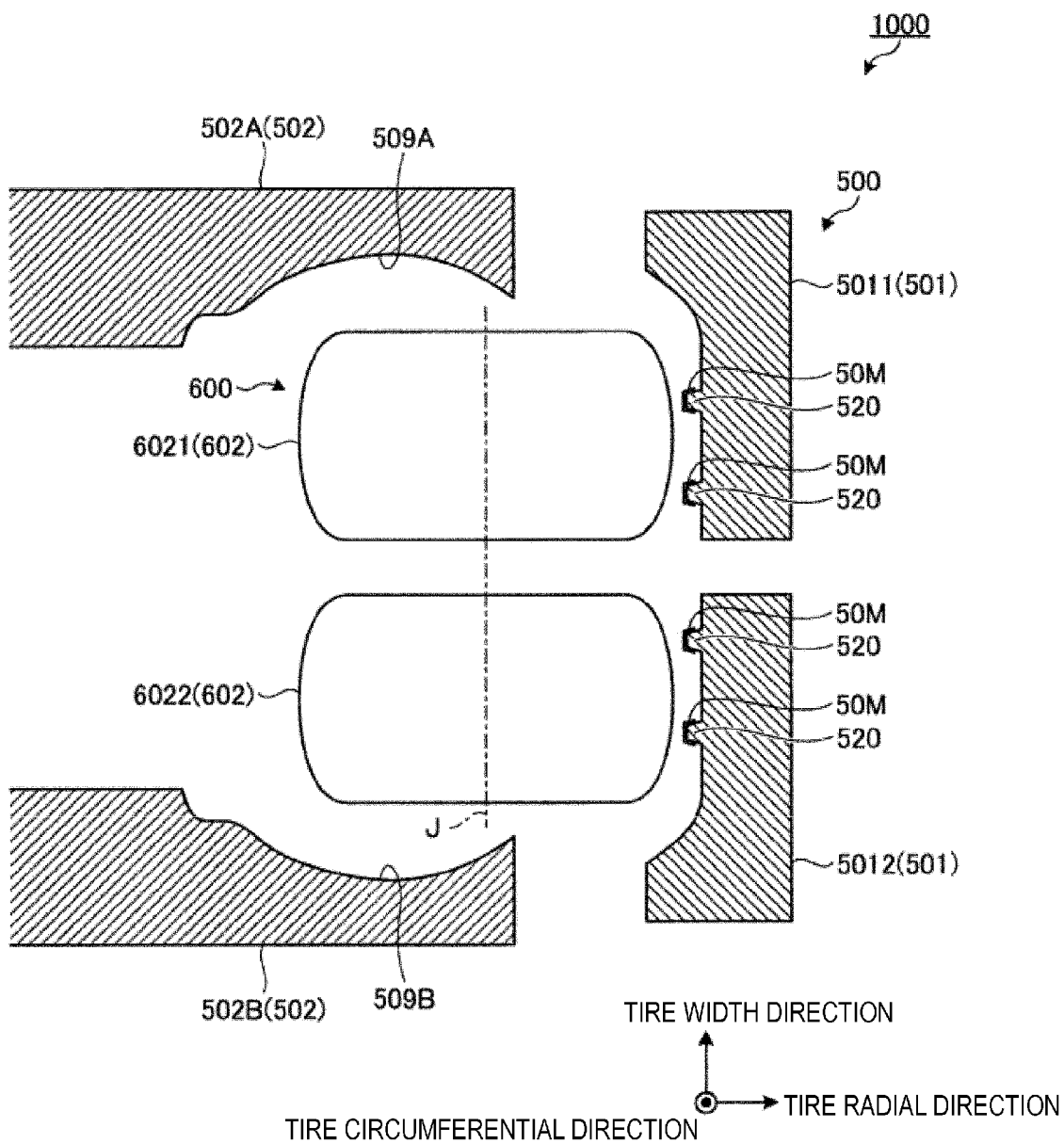
FIG. 14 is a cross-sectional view schematically illustrating a portion of a manufacturing device for a pneumatic tire according to modified example 2 of the first embodiment.

FIG. 14 is a cross-sectional view illustrating a portion of the manufacturing device 1000 according to the present embodiment. As illustrated in FIG. 14, the sector molds 501 may each be divided into two sector molds 5011, 5012 in the tire width direction.

Note that in the present embodiment, the coating material 50M is supplied to the projection portions 520 from the supply device 600 with the sector molds 501 each being divided, and the side molds 502 being separated from the sector molds 501. The coating material 50M may also be supplied to the projection portions 520 when the sector molds 501 are coupled and the annular mold formed.

Note that the coating material 50M may also be applied to all of the bottom surface 41 and the side surfaces 42. The coating material 50M may also be applied to a portion of the contact patch 7.

Second Embodiment

A second embodiment will be described. In the description below, identical or substantially similar constituent portions to those of the above-described embodiment are assigned with the same reference numbers, and descriptions of those constituent portions are either simplified or omitted.

Figure 15:
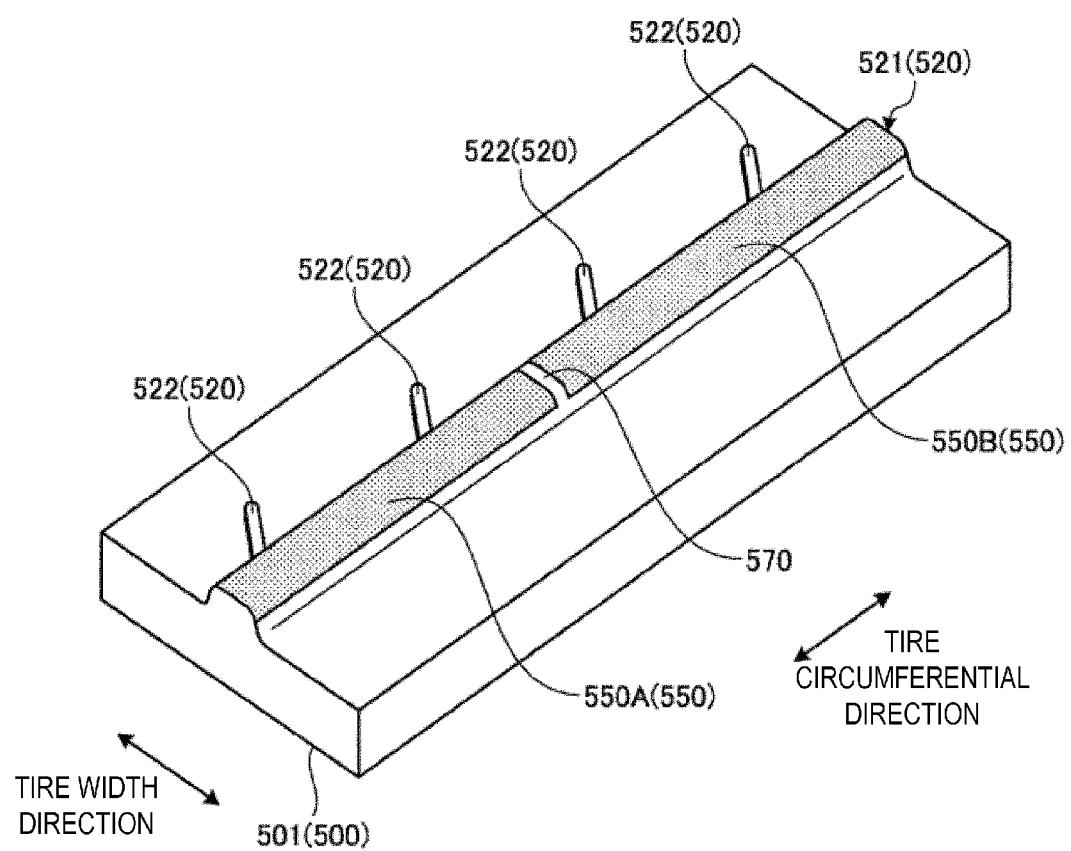
FIG. 15 is a perspective view schematically illustrating a portion of a manufacturing device for a pneumatic tire according to a second embodiment.

FIG. 15 is an enlarged view of a portion of the sector mold 501 of the vulcanization mold 500 according to the present embodiment. As illustrated in FIG. 15, the sector mold 501 includes the projection portion 520 for forming the groove 20 in the tread rubber 6 of the tire 1. The projection portion 520 includes a main groove projection portion 521 for forming the main groove 21 and lug groove projection portions 522 for forming the lug grooves 22.

The surfaces of the projection portions 520 on which the coating material 50M is supplied include rough surface regions 550 rendered with a rough surface.

The rough surface regions 550 include a first rough surface region 550A and a second rough surface region 550B disposed adjacent to the first rough surface region 550A with a non-rough surface region 570 disposed therebetween.

The first rough surface region 550A and the second rough surface region 550B are disposed on the surface of the main groove projection portion 521 in the tire circumferential direction.

The non-rough surface region 570 disposed between the first rough surface region 550A and the second rough surface region 550B has dimensions in the tire circumferential direction smaller than that of the first rough surface region 550A and the second rough surface region 550B.

The arithmetic mean roughness of the rough surface regions 550 (550A, 550B) is from 0.5 µm to 150 µm (as per JIS B0601-1994). The arithmetic mean roughness of the non-rough surface region 570 is 0.1 µm or less.

The process for roughening the surface of the rough surface regions 550 includes processing by sand blasting. Note that a process of knurling may be used to form the rough surface regions 550. Additionally, the rough surface regions 550 may include an uneven portion formed by a plurality of slits.

In a similar manner to that of the embodiment described above, the application member 602 applies the coating material 50M to the projection portions 520. The rough surface regions 550 function as affinity regions that hold the coating material 50M. The coating material 50M is sufficiently applied to the rough surface regions 550. The non-rough surface region 570 functions as a non-affinity region that does not hold the coating material 50M. The coating material 50M is not applied to the non-rough surface region 570.

Figure 16:
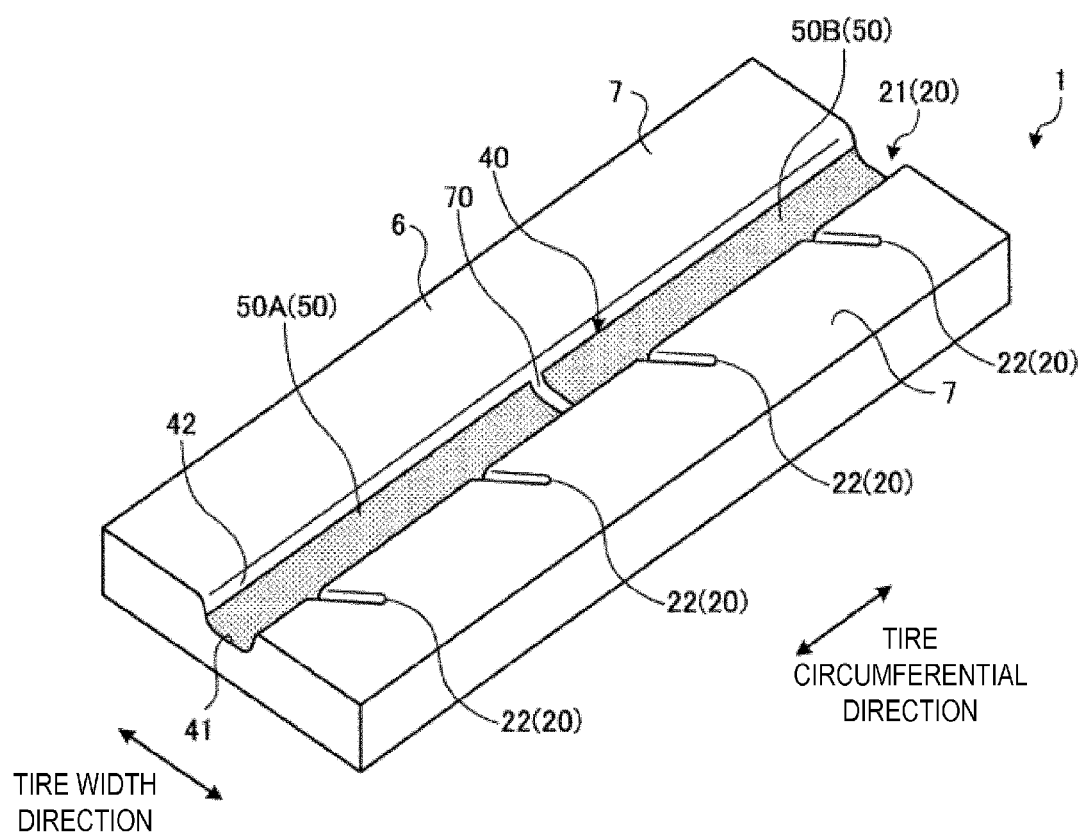
FIG. 16 is a perspective view schematically illustrating a portion of a groove of a pneumatic tire according to the second embodiment.

FIG. 16 is a perspective view schematically illustrating a portion of the tire 1 formed by the sector mold 501 described while referencing FIG. 15. As illustrated in FIG. 16, the tread rubber 6 of the tire 1 includes the main groove 21 disposed in the tire circumferential direction and the lug grooves 22 communicating with the main groove 21. The coating film 50 is disposed on the inner surface 40 of the main groove 21.

The coating film 50 includes a first coating film 50A and a second coating film 50B disposed adjacent to the first coating film 50A with a gap therebetween. The first coating film 50A and the second coating film 50B are disposed in the tire circumferential direction in the main groove 21.

A gap portion 70 is provided between the first coating film 50A and the second coating film 50B. The gap portion 70 is a portion where there is no coating film 50. The inner surface 40 of the tread rubber 6 is exposed at the gap portion 70.

The first coating film 50A is a film of the coating material 50M transferred from the first rough surface region 550A. The second coating film 50B is a film of the coating material 50M transferred from the second rough surface region 550B.

As the non-rough surface region 570 holds no coating material 50M, coating material 50M is not transferred from the non-rough surface region 570 to the green tire 1G. Thus, the first coating film 50A, the second coating film 50B, and the gap portion 70 without the coating film 50 disposed between the first coating film 50A and the second coating film 50B are provided on the inner surfaces 40 of the grooves 20 of the tire 1.

The dimensions of the gap portion 70 in the tire circumferential direction are less than the dimensions of the first coating film 50A and the second coating film 50B.

Note that FIG. 16 illustrates a portion of the main groove 21. In the present embodiment, the gap portion 70 may be provided at four positions in the main groove 21, for example. The main groove 21 may be provided with a first coating film, a second coating film disposed adjacent to the first coating film with a gap therebetween, a third coating film disposed adjacent to the second coating film with a gap therebetween, and a fourth coating film disposed adjacent to the third coating film with a gap therebetween. Note that the number of gap portions 70 (number of coating films disposed in the tire circumferential direction) is not limited to four. The number of gap portions 70 (number of coating films disposed in the tire circumferential direction) may be two, three, or five or more.

As described above, according to the present embodiment, by roughening the surfaces of the projection portions 520, the holding power of the coating material 50M provided by the projection portions 520 is improved, and the projection portions 520 can hold a sufficient amount of the coating material 50M. Additionally, by improving the holding power, the coating material 50M is prevented from dripping from the projection portions 520 after the projection portions 520 are supplied with the coating material 50M.

Additionally, in the present embodiment, the surfaces of the projection portions 520 include the rough surface regions 550, which are affinity regions with high affinity to the coating material 50M and the non-rough surface region 570, which is a non-affinity region with low affinity to the coating material 50M. By adjusting the surface roughness of the rough surface regions 550 and the non-rough surface region 570 so that the rough surface regions 550 sufficiently hold the coating material 50M and the non-rough surface region 570 do not hold the coating material 50M, the coating material 50M can be transferred from the rough surface regions 550 to the green tire 1G and not transferred from the non-rough surface region 570 to the green tire 1G As a result, a pattern of the coating film 50 that corresponds to the pattern of the rough surface regions 550 and the non-rough surface region 570 is formed on the inner surfaces 40 of the grooves 20. In other words, according to the present embodiment, the manufacturing device 1000 is capable of patterning the coating film 50 using the projection portions 520 with a surface including the rough surface regions 550 and the non-rough surface region 570.

Additionally, by disposing the non-rough surface region 570 between the first rough surface region 550A and the second rough surface region 550B, the first coating film 50A and the second coating film 50B are provided on the inner surface 40 of the groove 20, the first coating film 50A being the film of coating material 50M transferred from the first rough surface region 550A, and the second coating film 50B being the film of coating material 50M transferred from the second rough surface region 550B. The coating material 50M is not transferred from the non-rough surface region 570 to the green tire 1G thus the gap portion 70 with no coating film 50 is provided between the first coating film 50A and the second coating film 50B. By providing the gap portion 70 between the first coating film 50A and the second coating film 50B and dividing the coating film 50, the expansion of separation of the coating film 50 is suppressed. For example, even if, out of the plurality of coating films 50, the first coating film 50A is damaged and separates from the tread rubber 6, the second coating film 50B adjacent to the first coating film 50A is prevented from separating from the tread rubber 6.

If the coating film 50 is disposed continuously in the tire circumferential direction, when a portion of the coating film 50 is damaged and separates from the tread rubber 6, the separation may expand to other portions of the coating film 50. As a result, the coating film 50 as a whole may be degraded.

In the present embodiment, by providing the gap portion 70 of the coating film 50 between the first coating film 50A and the second coating film 50B, expansion of separation of the coating film 50 is suppressed. Even if the first coating film 50A separates, expansion of separation ceases at the gap portion 70 and separation of the second coating film 50B is suppressed. Thus, reduction of ultraviolet light shielding functionality and air barrier functionality of the coating film 50 is suppressed.

Additionally, in the present embodiment, the first rough surface region 550A and the second rough surface region 550B are disposed on the surface of the main groove projection portion 521 in the tire circumferential direction, and the dimensions of the non-rough surface region 570 between the first rough surface region 550A and the second rough surface region 550B in the tire circumferential direction are smaller than the dimensions of the first rough surface region 550A and the second rough surface region 550B. Thus, the dimensions of the gap portion 70 in the tire circumferential direction can be made smaller than the dimensions of the coating film 50 (50A, 50B). By the gap portion 70 having smaller dimensions in the tire circumferential direction and the first coating film 50A and the second coating film 50B having larger dimensions, the functions of the coating film 50, ultraviolet light shielding functionality and air barrier functionality, can be sufficiently exhibited, and expansion of separation of the coating film 50 can be suppressed.

Additionally, in the present embodiment, the arithmetic mean roughness of the rough surface regions 550 is from 0.5 µm to 150 µm. If the arithmetic mean roughness of the rough surface regions 550 is less than 0.5 µm, the holding power of the coating material 50M provided by the projection portion 520 may not be sufficient. If the arithmetic mean roughness of the rough surface regions 550 is greater than 150 µm, the holding power of the coating material 50M provided by the projection portions 520 becomes excessive, and the coating material 50M is unlikely to be transferred from the projection portions 520 to the green tire 1G. By the arithmetic mean roughness of the rough surface regions 550 being from 0.5 µm to 150 µm, the projection portions 520 can hold the coating material 50M, and the coating material 50M can be transferred to the green tire 1G.

Note that a fluorine-based treatment may be used on the non-rough surface region 570 to impart the non-rough surface region 570 with properties to repel the coating material 50M.

Additionally, according to the present embodiment, the coating film 50 is disposed in a divided manner. Thus, even if out of the plurality of coating films 50, the first coating film 50A, for example, is damaged and separates from the tread rubber 6, the second coating film 50B adjacent to the first coating film 50A is prevented from separating from the tread rubber 6.

For example, if the coating film 50 is disposed continuously in the tire circumferential direction, when a portion of the coating film 50 is damaged and separated from the tread rubber 6, the separation may expanded to other portions of the coating film 50. As a result, the coating film 50 as a whole may be degraded.

In the present embodiment, by providing the gap portion 70 of the coating film 50 between the first coating film 50A and the second coating film 50B, expansion of separation is suppressed. Even if the first coating film 50A separates, expansion of separation ceases at the gap portion 70 and separation of the second coating film 50B is suppressed. Thus, reduction of ultraviolet light shielding functionality and air barrier functionality of the coating film 50 is suppressed.

Additionally, in the present embodiment, the dimensions of the gap portion 70 in the tire circumferential direction are smaller than the dimensions of the coating films 50 (50A, 50B). As a result, ultraviolet light shielding functionality and air barrier functionality are retained and expansion of separation is suppressed.

Modified Example 1 of Second Embodiment

Figure 17:
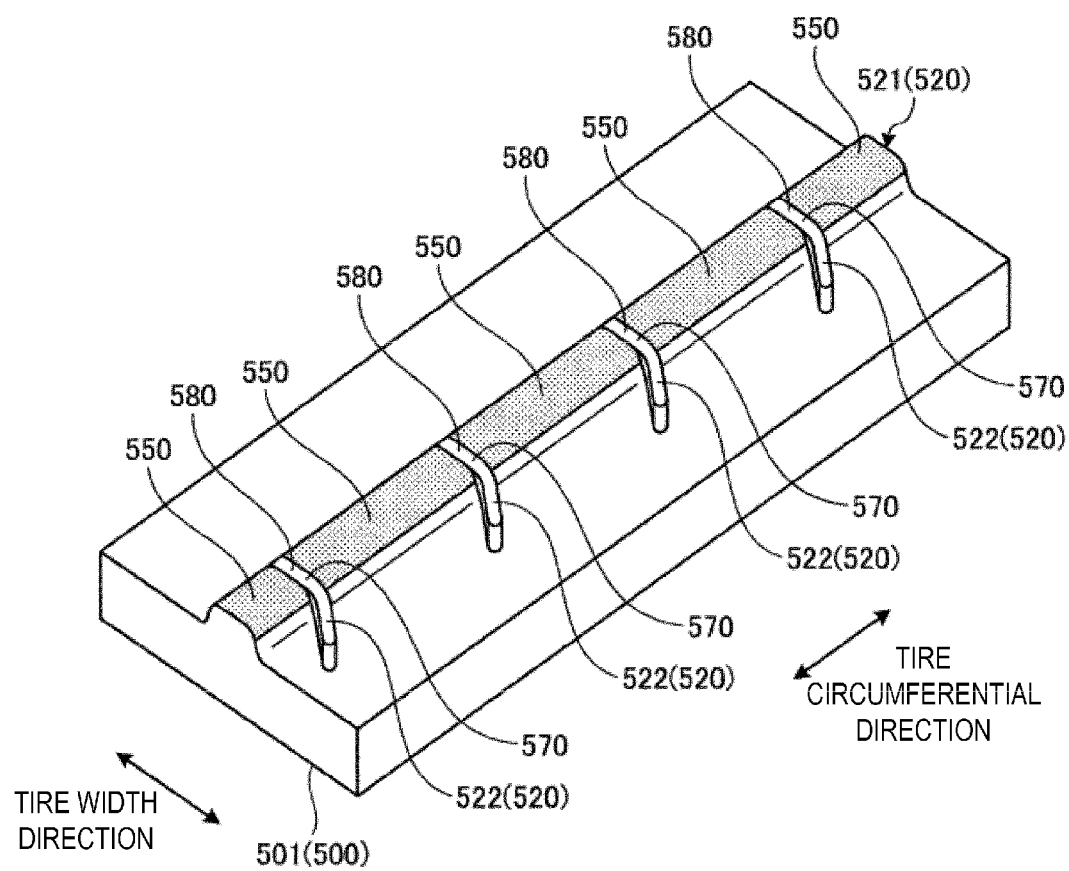
FIG. 17 is a perspective view schematically illustrating a portion of a manufacturing device for a pneumatic tire according to modified example 1 of the second embodiment.

FIG. 17 is an enlarged view of a portion of the sector mold 501 of the vulcanization mold 500 according to the present embodiment. As illustrated in FIG. 17, the sector mold 501 includes the projection portions 520 for forming the grooves 20 in the tread rubber 6 of the tire 1. The projection portions 520 includes the main groove projection portion 521 for forming the main groove 21 and the lug groove projection portions 522 for forming the lug grooves 22. The main groove projection portion 521 and the lug groove projection portions 522 communicate with each other. The lug groove projection portions 522 are provided in a branching manner from the main groove projection portion 521.

The surface of the projection portion 520 supplied with the coating material 50M includes the rough surface regions 550 rendered with a rough surface and the non-rough surface regions 570 with a lower arithmetic mean roughness than the rough surface regions 550.

The non-rough surface regions 570 are disposed at intersection portions 580 where the main groove projection portion 521 and the lug groove projection portions 522 meet.

Figure 18:
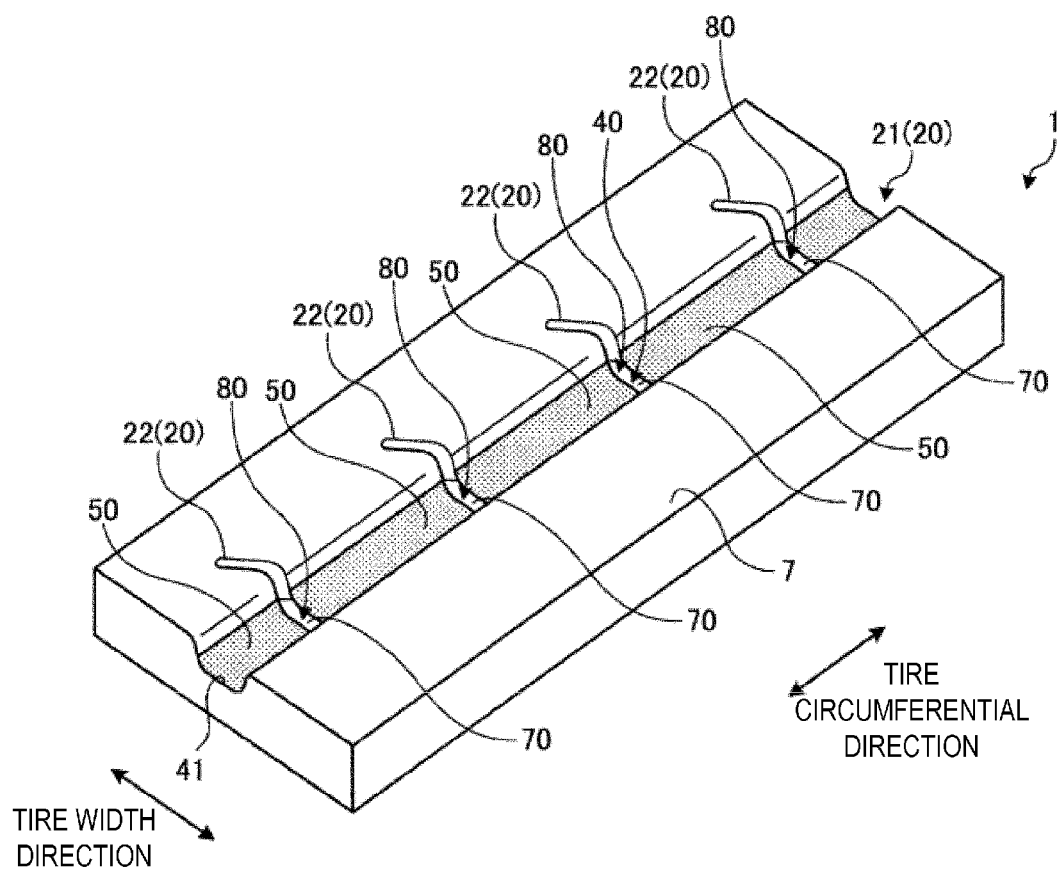
FIG. 18 is a perspective view schematically illustrating a portion of a groove of a pneumatic tire according to modified example 1 of the second embodiment.

FIG. 18 is a perspective view schematically illustrating a portion of the groove 20 of the tire 1 formed by the sector mold 501 described while referencing FIG. 17. As illustrated in FIG. 18, the tread rubber 6 of the tire 1 includes the main groove 21 disposed in the tire circumferential direction and the lug grooves 22 communicating with the main groove 21. The coating film 50 is disposed on the inner surface 40 of the main groove 21. A plurality of coating films 50 are disposed in the tire circumferential direction with the gap portions 70 disposed therebetween.

In the example illustrated in FIG. 18, the gap portions 70 are disposed at intersection portions 80 where the main groove 21 and the lug grooves 22 meet.

In the example illustrated in FIG. 18, separation of the coating film 50 is suppressed as described above. When the tire 1 runs, the intersection portions 80 where the main groove 21 and the lug grooves 22 meet are prone to deformation. By providing the non-rough surface regions 570 at the intersection portions 580 where the main groove projection portion 521 and the lug groove projection portions 522 meet, the gap portions 70 without the coating film 50 are provided at the deformation-prone intersection portions 80 where the main groove 21 and the lug grooves 22 meet. By not providing the deformation-prone intersection portions 80 with the coating film 50, separation of the coating film 50 is suppressed.

Modified Example 2 of Second Embodiment

Figure 19:
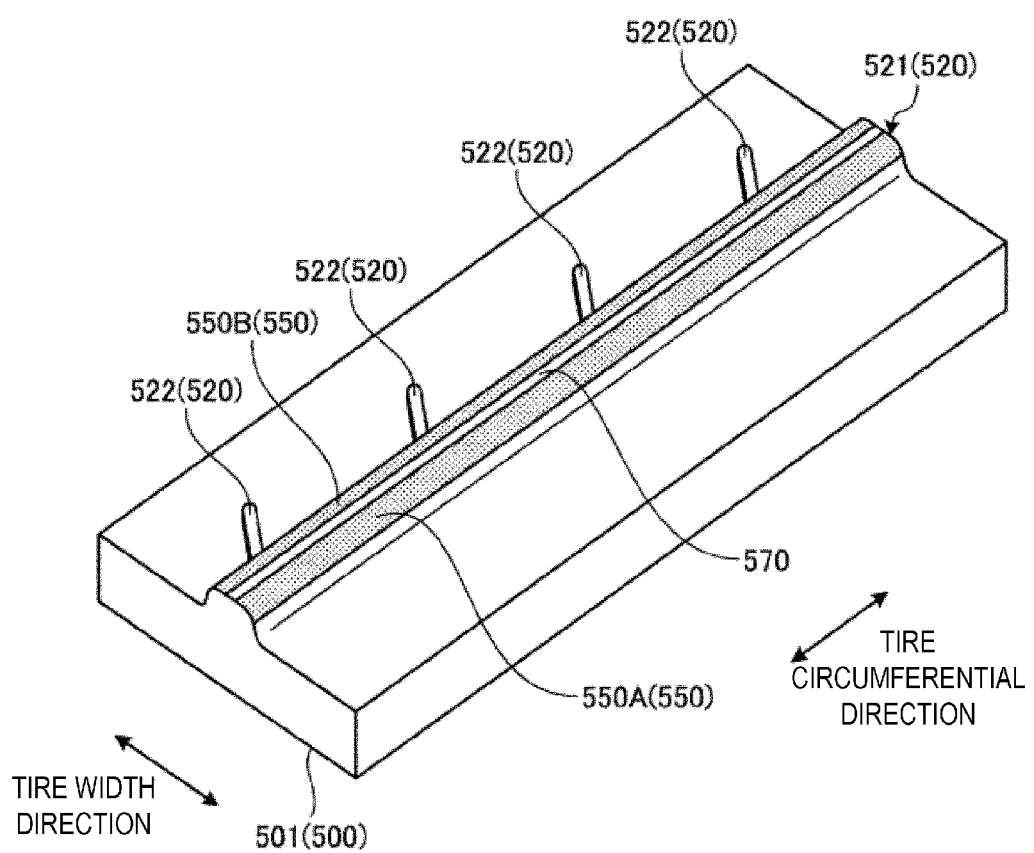
FIG. 19 is a perspective view schematically illustrating a portion of a manufacturing device for a pneumatic tire according to modified example 2 of the second embodiment.

FIG. 19 is an enlarged view of a portion of the sector mold 501 of the vulcanization mold 500 according to the present embodiment. As illustrated in FIG. 19, the sector mold 501 includes the projection portions 520 for forming the grooves 20 in the tread rubber 6 of the tire 1. The projection portions 520 include the main groove projection portion 521 for forming the main groove 21 and the lug groove projection portions 522 for forming the lug grooves 22.

The surfaces of the projection portions 520 on which the coating material 50M is supplied include rough surface regions 550 rendered with a rough surface.

The rough surface regions 550 include the first rough surface region 550A and the second rough surface region 550B disposed adjacent to the first rough surface region 550A with the non-rough surface region 570 disposed therebetween.

The first rough surface region 550A and the second rough surface region 550B are disposed on the surface of the main groove projection portion 521 in the tire width direction.

The non-rough surface region 570 disposed between the first rough surface region 550A and the second rough surface region 550B has dimensions in the tire width direction smaller than that of the first rough surface region 550A and the second rough surface region 550B.

Figures 20, 21:
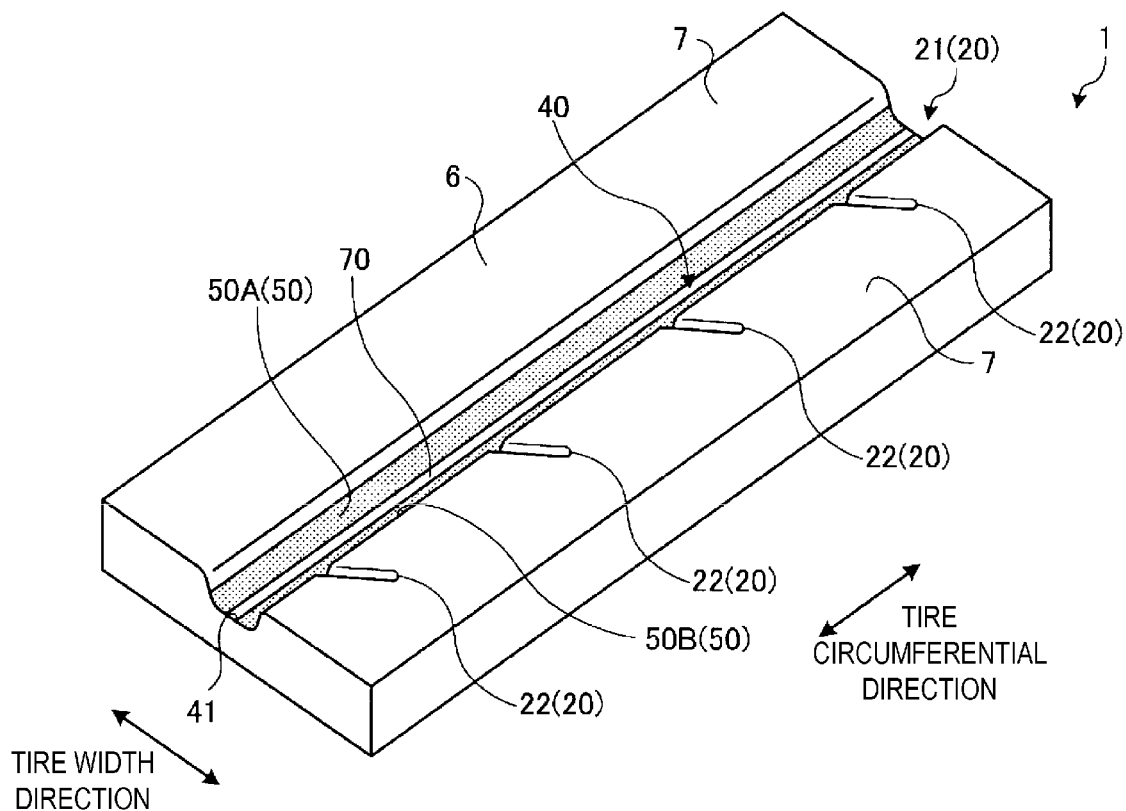
FIG. 20 is a perspective view schematically illustrating a portion of a groove of a pneumatic tire according to modified example 2 of the second embodiment.
FIG. 21 is a table illustrating an example of results of the evaluation tests for tires.

FIG. 20 is a perspective view schematically illustrating a portion of the tire 1 formed by the sector mold 501 described while referencing FIG. 19. As illustrated in FIG. 20, the tread rubber 6 of the tire 1 includes the main groove 21 disposed in the tire circumferential direction and the lug grooves 22 communicating with the main groove 21. The coating film 50 is disposed on the inner surface 40 of the main groove 21.

The coating film 50 includes the first coating film 50A and the second coating film 50B disposed adjacent to the first coating film 50A with a gap therebetween. The first coating film 50A and the second coating film 50B are disposed in the tire width direction in the main groove 21.

The gap portion 70 is provided between the first coating film 50A and the second coating film 50B. The gap portion 70 is a portion where there is no coating film 50. The inner surface 40 of the tread rubber 6 is exposed at the gap portion 70.

The first coating film 50A is a film of the coating material 50M transferred from the first rough surface region 550A. The second coating film 50B is a film of the coating material 50M transferred from the second rough surface region 550B.

As the non-rough surface region 570 holds no coating material 50M, coating material 50M is not transferred from the non-rough surface region 570 to the green tire 1G Thus, the first coating film 50A, the second coating film 50B, and the gap portion 70 without the coating film 50 disposed between the first coating film 50A and the second coating film 50B are provided on the inner surfaces 40 of the grooves 20 of the tire 1.

The dimensions of the gap portion 70 in the tire width direction are less than the dimensions of the first coating film 50A and the second coating film 50B.

Note that the number of gap portions 70 (number of coating films disposed in the tire circumferential direction) may be three or more.

As described above, in the present embodiment, the coating film 50 is disposed in a divided manner. Thus, even if the first coating film 50A is damaged and separates from the tread rubber 6, the second coating film 50B adjacent to the first coating film 50A is prevented from separating from the tread rubber 6.

Additionally, by the dimensions in the tire width direction of the non-rough surface region 570 being small, the dimensions of the gap portions 70 in the tire width direction can be made small, and the dimensions of the first coating film 50A and the second coating film 50B can be made large. Thus, the coating film 50 can exhibit sufficient functionality, and expansion of separation of the coating film 50 can be suppressed.

EXAMPLES

Evaluation tests were carried out for the tire 1. FIG. 21 is a table illustrating an example of results of the evaluation tests for the tire 1. In FIG. 21, the results of the evaluation tests are shown for Example 1 and Example 2, which are tires 1 including the coating film 50 as per the embodiments described above. The coating film 50 of Example 1 includes a resin composition with urethane as a main component and a carbon black. The coating film 50 of Example 2 includes a resin composition with urethane as a main component and a benzotriazole-based UV absorbent. For both Example 1 and 2, the coating film 50 is disposed on the inner surfaces 40 of the main grooves 21. Additionally, for both Example 1 and 2, the coating film 50 is disposed covering the inner surfaces 40 on the bottom surface 41 side of positions 100 located at 0.5H from the contact patch 7 in the depth direction of the groove 20, where H is the depth of the groove 20 when the tire 1 is new.

The results of the evaluation test are also shown for the Comparative Example, which is a tire 1 without the coating film 50.

The tire size for the tires 1 of Example 1 and 2 and the tire of the Comparative Example was 215/60R16 95H.

In the evaluation tests, accelerated anti-weathering tester (Xenon Weather Meter) was used to expose the tires to ultraviolet light having an irradiance of 150 W/m² for 800 hours. Then, these tires were mounted on a drum testing machine and ran for 20000 km. Note that for the tests involving the drum testing machine, the internal tire pressure was 200 kPa, a load of 5.0 kN was applied, and the tires were run at a speed of 80 km/h. Upon completion, the presence/absence of groove cracking was evaluated.

As illustrated in FIG. 21, groove cracking was evident in Comparative Example 1 and not evident in Example 1 and Example 2. This confirmed that providing the coating film 50 suppressed groove cracking.

The invention claimed is:

1. A pneumatic tire that rotates about a center axis, the pneumatic tire comprising:
   a tread rubber that comprises a contact patch;
   a groove provided in the tread rubber, the groove comprising an inner surface that comprises a bottom surface and side surfaces that connect the bottom surface to the contact patch;
   a wear indicator provided in the groove; and
   a coating film disposed covering at least a portion of the inner surface, the coating film reducing exposure of ultraviolet light to the inner surface; wherein
   the inner surface has a center line average surface roughness (Ra75) of from 1 μm to 100 μm,
   the coating film has a thickness of from 5 μm to 120 μm,
   the coating film is disposed covering the inner surface on the bottom surface side of an upper line of the wear indicator in a depth direction of the groove, and
   the tread rubber is exposed at a region of the inner surface of the groove from an uppermost surface of wear indicator to the contact patch.

2. The pneumatic tire according to claim 1, wherein the inner surface has a center line average surface roughness (Ra75) of from 1 μm to 2 μm, and the center line average surface roughness (Ra75) is measured with a laser-type non-contact surface roughness measuring device.

3. The pneumatic tire according to claim 1, wherein the coating film has a thickness of from 20 μm to 60 μm.

4. The pneumatic tire according to claim 1, wherein the coating film comprises a resin composition with urethane as a main component and a carbon black or a pigment.

5. The pneumatic tire according to claim 1, wherein the coating film comprises a resin composition with urethane as a main component and at least one of: a benzotriazole-based ultraviolet light absorbing agent, a benzophenone-based ultraviolet light absorbing agent, a salicylate-based ultraviolet light absorbing agent, a cyanoacrylate-based ultraviolet light absorbing agent, a nickel-based ultraviolet light absorbing agent, a triazine-based ultraviolet light absorbing agent, or a hindered amine-based light stabilizer.

6. The pneumatic tire according to claim 1, wherein the coating film comprises a resin composition with urethane as a main component and titanium oxide or zinc oxide.

7. The pneumatic tire according to claim 6, wherein the resin composition has polycarbonate-based urethane as a main component.

8. The pneumatic tire according to claim 1, further comprising a primer film with a water-based acrylic emulsion as a main component disposed between the inner surface and the coating film.

9. The pneumatic tire according to claim 1, wherein the following conditions are satisfied:

$H \geq 0.3D$, and $H/W \leq 5$, where

H is a depth of the groove, W is a width of the groove, and D is a thickness of the tread rubber.

10. The pneumatic tire according to claim 1, wherein the coating film is disposed covering the inner surface on a bottom surface side of positions located at 0.5H or inward of 0.5H from the contact patch in the depth direction of the groove, where H is a depth of the groove when the pneumatic tire is new.

11. The pneumatic tire according to claim 1, wherein the coating film comprises a first coating film and a second coating film disposed adjacent to the first coating film with a gap portion therebetween.

12. The pneumatic tire according to claim 11, wherein the groove comprises a main groove disposed in a tire circumferential direction; the first coating film and the second coating film are disposed in the main groove in the tire circumferential direction; and dimensions in the tire circumferential direction of the gap portion of the coating film located between the first coating film and the second coating film are less than dimensions in the tire circumferential direction of the first coating film and the second coating film.

13. The pneumatic tire according to claim 12 wherein the groove comprises a lug groove connected to the main groove; and the gap portion is disposed at an intersection portion where the main groove and the lug groove meet.

14. The pneumatic tire according to claim 11, wherein the groove comprises a main groove disposed in a tire circumferential direction; the first coating film and the second coating film are disposed in the main groove in a tire width direction; and dimensions in the tire width direction of the gap portion of the coating film located between the first coating film and the second coating film are less than dimensions in the tire width direction of the first coating film and the second coating film.

15. The pneumatic tire according to claim 1, wherein the coating film has a transmittance with respect to the ultraviolet light having wavelengths from 290 nm to 380 nm of 0.5 or less.

* * * * *